(12) United States Patent
McGregor et al.

(10) Patent No.: US 7,058,386 B2
(45) Date of Patent: Jun. 6, 2006

(54) MOBILE PHONE DISTRIBUTION SYSTEM

(75) Inventors: Donald Scott McGregor, Spokane, WA (US); Gregory M. McGregor, Danville, CA (US)

(73) Assignee: Telemac Corporation, Los Angeles, CA (US)

( * ) Notice: Subject to any disclaimer, the term of this patent is extended or adjusted under 35 U.S.C. 154(b) by 0 days.

(21) Appl. No.: 10/251,262

(22) Filed: Sep. 20, 2002

(65) Prior Publication Data

US 2003/0100290 A1 May 29, 2003

Related U.S. Application Data

(63) Continuation of application No. 09/747,849, filed on Dec. 21, 2000, now abandoned, which is a continuation of application No. 08/648,596, filed on May 16, 1996, now Pat. No. 6,243,574, which is a division of application No. 08/265,373, filed on Jun. 23, 1994, now Pat. No. 5,625,669, which is a continuation-in-part of application No. 07/767,231, filed on Sep. 27, 1991, now Pat. No. 5,325,418.

(51) Int. Cl.
H04M 3/00 (2006.01)
H04M 1/66 (2006.01)
H04M 1/68 (2006.01)
H04M 3/16 (2006.01)

(52) U.S. Cl. ............... 455/405; 455/410; 455/411; 455/418; 455/550.1; 455/18

(58) Field of Classification Search ............ 455/418, 455/18, 405, 550.1, 411, 410
See application file for complete search history.

(56) References Cited

U.S. PATENT DOCUMENTS 3,725,947 A 4/1973 Albertini et al.

4,331,834 A * 5/1982 Ganz et al.

(Continued)

FOREIGN PATENT DOCUMENTS

| EP | 0367361 | * | 5/1990 |
| GB | 2249459 | * | 5/1992 |
| WO | WO 95/15065 A1 | | 6/1995 |
| WO | WO 92/16078 A1 | | 9/2002 |

OTHER PUBLICATIONS

Lee, "Mobile Cellular Telecommunications System", 1989 pp. 68–73.

Nokia Service Manual, 101/1000, Nokia Mobile Phones, Inc., copyright 1991 and 1992, chapter 5.

(Continued)

*Primary Examiner*—William D. Cumming
(74) *Attorney, Agent, or Firm*—Townsend & Townsend and Crew, LLP

(57) ABSTRACT

A mobile telephone programming and accounting system that includes an integrated hardware system interlinking a telephone unit, a telephone interlink receiver, and a central processing unit connected to the interlink receiver. The hardware system also preferably includes a receipt printer and a credit card reader. The telephone unit is preferably equipped with an internal real time clock and calendar circuit and memory store to record the time and date of calls for reporting to the central processing unit to enable tracking and detailed accounting of calls. The interlink receiver in the improved design includes a gang platform for programming multiple phone units, which may be phone units of different manufacturers, and provides for automatic programming of the multiple units and, in the retail distribution setting, programming the operating parameters and assignment of the phone unit to a service provider with encryption keys to reduce service churning.

17 Claims, 24 Drawing Sheets

U.S. PATENT DOCUMENTS

| | | | |
|---|---|---|---|
| 4,635,285 A | | 1/1987 | Coombes |
| 4,831,647 A | | 5/1989 | D'Avello et al. |
| 4,839,829 A | | 6/1989 | Freedman |
| 4,916,621 A | | 4/1990 | Bean |
| 4,951,308 A | * | 8/1990 | Bishop et al. |
| 4,958,368 A | * | 9/1990 | Parker |
| 4,965,821 A | | 10/1990 | Bishop et al. |
| 5,020,091 A | | 5/1991 | Krolopp et al. |
| 5,023,936 A | | 6/1991 | Szczutkowski et al. |
| 5,046,082 A | * | 9/1991 | Zicker et al. |
| 5,046,188 A | | 9/1991 | Molnar |
| 5,109,401 A | | 4/1992 | Hattori et al. |
| 5,127,041 A | | 6/1992 | O'Sullivan |
| 5,133,081 A | * | 7/1992 | Mayo ........................... 455/18 |
| 5,138,650 A | | 8/1992 | Stahl et al. |
| 5,144,649 A | | 9/1992 | Zicker |
| 5,203,014 A | | 4/1993 | Wagai et al. |
| 5,291,543 A | * | 3/1994 | Freese et al. ............... 455/408 |
| 5,297,192 A | | 3/1994 | Gerszberg |
| 5,301,223 A | * | 4/1994 | Amadon et al. |
| 5,303,297 A | | 4/1994 | Hillis |
| 5,309,500 A | | 5/1994 | Koma et al. |
| 5,315,638 A | * | 5/1994 | Mukari |
| 5,325,418 A | * | 6/1994 | McGregor et al. |
| 5,335,278 A | | 8/1994 | Matchett et al. |
| 5,361,297 A | | 11/1994 | Ortiz et al. |
| 5,384,776 A | | 1/1995 | Gulliford et al. |
| 5,386,455 A | | 1/1995 | Cooper |
| 5,446,759 A | | 8/1995 | Campana, Jr. |
| 5,465,288 A | * | 11/1995 | Falvey et al. |
| 5,485,505 A | * | 1/1996 | Norman et al. |
| 5,491,740 A | * | 2/1996 | Ellis et al. ................... 455/418 |
| 5,509,056 A | | 4/1996 | Ericsson et al. |
| 5,526,357 A | | 6/1996 | Jandrell |
| 5,625,669 A | * | 4/1997 | McGregor et al. |
| 5,673,306 A | * | 9/1997 | Amadon et al. |
| 5,812,953 A | * | 9/1998 | Griffith et al. .............. 455/550 |
| 6,138,004 A | * | 10/2000 | McGregor et al. .......... 455/411 |
| 6,243,574 B1 | * | 6/2001 | McGregor et al. .......... 455/418 |
| 2003/0008636 A1 | * | 1/2003 | McGregor et al. .......... 455/410 |
| 2003/0100290 A1 | * | 5/2003 | McGregor et al. .......... 455/410 |

OTHER PUBLICATIONS

TRAC Cellular Rental System Operation Manual Version 5.0, Release 1.00, 1993.

Simms Communications, Incorporated, "Instafone" 1993.

Eleftheriadis, Theologou, "User Profile Identification in Future Mobile Telecommunications Systems", IEEE Network Sep. 1994.

* cited by examiner

```
            Welcome to              Cellular
                                    System 1
                              Copyright (c)

System Name:         [xxxxxxxxxxxxx]

Console Login:       [xxxxx]
```

FIG. 18 A

```
          Welcome to the            Cellular
                                    System 1
                              Copyright (c)

Salesperson ID:      [xxxxxxxxxxxxx]

Password:            [xxxxx]
```

FIG. 18 B

```
        [          System 1                    ]

[       Main Menu]

1)    MIN Inventory Maintenance
        2)    Place Order
        3)    Program Phones
        4)    Ship an Order
        5)    Customer Maintenance
        6)    Company Maintenance
        7)    Report Generation
        8)    System Administration
```

FIG. 18 C

```
          Data Entry]

Order Number:      _____
Company Number:    _____
Order Date:        __/__/__
PO Number:         _____
Shipping Date:     __/__/__
Shipping Address:  _____
Shipping City:     _____
Shipping State:    _____
Shipping Zip:      _____
[Save] [Remove] [Search] [Order Listing] [Quit]
```

FIG. 18 G

```
              [Data Entry]

Order Number:   xxxxxxx _____
Model Number:           _____
Quantity:               _____

[Save] [Remove] [Search] [Quit]
```

FIG. 18 H

```
              [Data Entry]

Order Number:    _____
Phone Model:     _____
GIM:             _____

[Begin Batch] [Quit]
```

FIG. 18 I

```
                    [Data Entry]

Order Number:        _____xxxxx_____
    Phone Model:         _____xxxxx_____
    GIM:                 _____xxxxx_____
    ESN:                 _____
    MIN:                 _____
    Program Date:        __/__/__
    Program Time:        __/__/__
    Programming Parameters: _____

[Read] [Program] [Quit]
```

FIG. 18 J

```
                    [Data Entry]

Name: _____  SIC code: ____
    Identififcation Number: __-__
    Phone Number:     (__)__-____
    Address: _____
    City:    _____  State: ____
    Zip:     _____

[Save] [Remove] [Search] [Quit]
```

FIG. 18 K

```
                    [Data Entry]
Company number:  _____
Name:            _____
Address:         _____
City:            _____   State: _____
Zip:             _____
Phone Number:    (__)__-____       Contact Name: _____
Area Code:       _____
SID:             _____

GIM #1:  _____    Description #1: _____
GIM #2:  _____    Description #2: _____
GIM #3   _____    Description #3: _____

[Save] [Remove] [Search] [Quit]
```

FIG. 18 L

```
          [        System 1         ]
                   Cellular

[      Report Menu]
        1)  MIN Inventory
        2)  Open Orders
        3)  Active Assignment Listing
        4)  Company Listing
        5)  Active Salesperson
        6)  Customer History
        7)  Shipment Listing

[Quit]
```

FIG. 18 M

```
                    Report
                 MIN Inventory

Begin Date: __/__/__,    End Date: __/__/__

MIN      Date                                ESN
    Number   Received    Salesperson   Loaded By  Assignment
```

FIG. 18 N

```
                 Activation's Report
    Begin Date: __/__/__,    End Date: __/__/__

ESN      MIN                        Date
    Number   Number   Salesperson       Programmed
```

FIG. 18 O

```
                    Report
                 Retail Outlines
    Number:   _____
    Name:     _____
    Address:  _____
    City:     _____      State: _____
    Zip:      _____
```

FIG. 18 P

```
            Report
          Open Orders

Order Number:    _____
Company Number:  _____
Order Date:      __/__/__
PO #:            _____

Model
Number    Quantity
_____
```

*FIG. 18 Q*

```
              Report
         Salesperson Listing

ID            Name
_____
```

*FIG. 18 R*

```
              Report
          Customer History

Name:          _____      SIC Code: _____
ID #:          _ _ _____
Address:       _____
City:          _____      State: _____
Zip:           _____

Transaction
ESN          MIN        CSA                  Date
___          ___        ___              _____
```

FIG. 18 S

```
              Report
          Shipment Listing

Order Number:     _____
Company Number:   _____
Order Date:         _ / _ / _
PO #:

Model
Number     Quantity
_____     _____
```

FIG. 18 T

MOBILE PHONE DISTRIBUTION SYSTEM

This application is a continuation of U.S. patent application Ser. No. 09/747,849, filed Dec. 21, 2000, now abandoned, which is a continuation of U.S. patent Ser. No. 08/648,596, filed May 16, 1996, now U.S. Pat. No. 6,243,574, issued Jun. 5, 2001, which is a divisional of U.S. patent application Ser. No. 08/265,373, filed Jun. 23, 1994, now U.S. Pat. No. 5,625,669, issued Apr. 29, 1997, which is a continuation-in-part of U.S. patent application Ser. No. 07/767,231, filed Sep. 27, 1991, now U.S. Pat. No. 5,325,418, issued Jun. 28, 1994, the disclosures of which are hereby incorporated by reference as if set forth in full herein.

BACKGROUND OF THE INVENTION

This invention relates to a cellular telephone accounting system to track the location and usage of cellular phones and to provide an automatic accounting system for centralized record keeping, audit or account statements. The cellular telephone accounting system is particularly useful for rental of cellular phones where mobility of the phone presents unique problems in customer billing and accounting for the location and possession of the telephone unit. Similarly, the accounting system is useful for organizations with shared resources and equipment shared by employees, as in large private companies or government agencies. Frequently, in such organizations usage of mobile cellular telephones requires monitoring to insure appropriate distribution and authorized use of the phones. In both situations means is provided for determining where the phones have been, what calls have been made and when, and to whose account usage is to be attributed. Additionally, the organizations may desire means for determining what general account such use, including any service charges from outside vendors, should be charged.

Because existing commercial cellular phones are generally sold to a user/owner, detailed accounting schemes have been avoided in part to minimize complications with the already complicated requirements for crediting national or international communication carriers, local or regional carriers, and one or more cellular network area operators. Similarly, with multiple charges from multiple carriers, with services provided in a variety of governmental jurisdictions, tax accounting becomes a complex endeavor. With the factor of periodic use by a series of multiple users added, problems arise that cannot be resolved solely by programming changes in existing telephone units or central communication systems. While some of the features of the preferred embodiment described hereafter may be of the type that could be incorporated in central telephone service systems, inertia in altering massive communication protocols for selective applications, not of benefit to all subscribers, will inhibit implementation. Although other cellular telephone rental systems have been proposed, they have been unable to provide the full features required for proper monitoring of the location and usage of a mobile telephone unit to allow adequate flexibility in setting usage criteria for an organization or appropriate charge schedules for a rental business.

The cellular phone accounting system of this invention solves the problems in expanding the capability of existing cellular phone systems by improvements in software programming and hardware additions, which are preferably integrated into a composite system that is useful for small and large organizations.

It has been found that the primary object of this invention, to provide a system that is sufficiently flexible to enable a variety of customized tracking procedures to be incorporated to a customized cellular phone operation where a plurality of mobile telephone units are involved, can, with modifications, be applied to cellular telephone sales and distribution systems. Many of the procedures for activating and programming a new cellular phone, and entering it into a cellular network system are modified extensions to the unlocking, programming and temporary assignment of the phone in the rental or organizational setting. Additionally, since the problems of activating and assigning cellular telephones from different manufacturers to different service providers is not unique to cellular telephones, but applicable to any mobile communication device, the system described is applicable to MIRS telephones, PCS terminal phones, paging communicators or any wireless analog or digital communication device where such tasks as transaction records, credit checks, activation sequencing and sign-up for a service provider are involved.

Since cellular phone distributors and sellers may often be different entities than cellular service providers, a layer of accounting and tracking is required that is not within the province of the telephone system line operator and not adequately addressed by commercial cellular service providers or cellular telephone distributors. With modification and expansion, the tracking and accounting system devised, provides the foundation for an integrated and unified system for transfer of the communication unit from the manufacturers to the end user who signs on with the local service provider.

This modified system of programming and tracking mobile communication devices is most effectively demonstrated for purposes of description by the distribution of cellular telephone units from different manufacturers to the ultimate user. The embodiment of the system for use with a cellular telephone is therefore equally applicable to any mobile communication device, whether digital or analog or for voice or data transmission. The system is best implemented at the point of distribution by wholesalers, retailers or service providers for cellular phones or other mobile communication devices. In particular, this system meets the needs of a distributor of mobile phones from many different manufacturers and relates to a system for gang programming a plurality of mobile telephones and readying a mobile phone for immediate use by a customer or end user.

The programming, tracking and accounting system is a complete computer system that also includes a routine for encrypting the phone manufacturer's entry code on dedication of the phone or other device to a specified service provider, such that the service provider must unlock the device before the dedicated unit can be switched to a different service provider with replacement of the original access key. In addition to the important gang programming and anti-churn features, the integrated computer system provides an accounting system for tracking the use of the phone and its transfer to a particular customer and to the ultimate end user when the customer represents a group of end users.

In the field of cellular telephone communication systems, cellular telephone wholesalers and distributors customarily market a variety of different models of cellular phones from different cellular telephone manufacturers. Cellular phones are frequently marketed by cellular network service providers directly to users, including customers representing groups of end users. Service providers often contract with multiple manufacturers to obtain quantity discounts or to offer potential service customers different phone options, at different prices with different features. The chore of programming many phone units from different manufacturers is problematic, particularly when it is not desirable to have phone units with assigned phone numbers in a slow moving inventory. Typically, groups of phones are required to be programmed on an "as needed" basis and desirably unlocked for use only when assigned to a customer or end user. The feature of gang programming multiple phone units is therefore extremely important to an efficient cellular telephone distribution operation.

Additionally, the inherent mobility of the cellular phone unit with the resultant ability to incur substantial charges for telecommunication services makes accurate tracking imperative. Given the variety of factors and variables in delivering an operable cellular phone unit to an ultimate user within a discrete geographical local, a coordinated system of tracking and security is required. This complex task is complicated by the competitive marketing practices of cellular and other telecommunication service providers, which often encourage users to switch service providers. The cellular service provider is traditionally not informed of the reasons a subscriber switches companies and thereby has no opportunity to bid for continued service, or determine if the service provided was satisfactory or not. The inclusion of an anti-churn feature requiring the phone unit to be reprogrammed only by the service center of the service provider before a service switch, is a desirable asset. Additionally, the ability to account for the whereabouts and use of a cellular unit in real time provides a substantial advantage in maintaining the security and integrity of a cellular telephone system. Because the field of cellular telephone communication systems has reached a level of maturity that problems are apparent in extending distribution to common retail outlets such as mass market department stores, the programming, tracking and accounting system devised provides a format solution that is applicable to a variety of wireless communication devices where additional layers of accounting and security are required because of mobility of the device, the parties involved, or the nature and content of the transmission.

The ability to activate, program and test a plurality of phone units simultaneously and complete the assignment of the units to an end user at a retail outlet greatly enhances the economy and usefulness of a comprehensive, multitiered, management system for communication units that may be purchased, rented, leased or simply given to an ultimate user.

SUMMARY OF THE INVENTION

The multitiered programming, tracking and accounting system of this invention is defined by the exemplars of a cellular telephone rental system and a cellular telephone distribution system. The system is equally applicable to any communication system where similar problems arise because of the complexity of the multiple party transaction and mobility of a communication device that may incur substantial charges.

The cellular telephone accounting system of this invention in one embodiment is configured as an integrated hardware system interlinking a cellular telephone unit, a telephone interlink receiver, and a central processing unit connected to the interlink receiver. The hardware system also preferably includes a receipt printer, particularly when used in a rental or sale operation for cellular phone units. The cellular telephone unit in one embodiment is equipped with an internal real-time clock and calendar circuit and memory store to record the time and date of calls for reporting to the central processing unit to enable tracking and detailed accounting for calls.

In centralized organizations, where one or more dispensing locations are contemplated, the central processing unit may comprise local processors, such as personal computers, connected by a file server network to a personal computer acting as a centralized information processor, or to a central mainframe or minicomputer. Alternately, multiple local processors may be periodically accessed by a centralized processor through a modem using commercial communication lines for data transfer.

In the preferred embodiments described, the system will include a credit card reader for credit verification, and, a receipt printer for instant production of statements, primarily useful for rental operations, but useable by organizations where computer record keeping is augmented by paper tracking. In such situations, slips identifying the user and other facts associated with checking-out and checking-in procedures for the mobile units may be useful at the dispensing location although charges and other usage accounting is handled internally in a centralized data processing system in coordination with other organizational accounting tasks.

A primary object of this invention is to devise a system that is sufficiently flexible to enable a variety of customized tracking procedures to be incorporated into a customized phone operation where a plurality of mobile telephone units are involved. The cellular telephone accounting system of the described, preferred embodiment includes all those needed features for a mobile telephone rental enterprise, and may be modified as desired for less complex operations that may be appropriate for internal governmental or private company operations. In the improved system, additional features enable the application of the system to a mobile phone distribution system that is capable of sales at a retail outlet and immediate activation for service.

The cellular telephone accounting system of this invention includes a plurality of interlinked components. In general, a plurality of mobile telephone units or cellular phones are involved, although the system could be used to monitor the use of a single telephone unit. The mobile telephone units described, each comprise a cellular phone including conventional circuitry and software to perform the customary communication transmission and reception functions. The units also include hardware and software means for call metering for coordinating call charges to national and regional phone systems in conjunction with one or more commercial cellular service operators. In addition, the mobile telephone unit of this invention for use in the rental setting or where an additional layer of call accounting is required includes a real time clock and calendar circuit module in each phone unit to date and time the calls and enable accurate coordination of phone usage with the location of use for enhanced billing detail or usage monitoring.

The phone unit, when dispensed and returned, is installed in the telephone interlink receiver which includes a boot having a terminal connector or interface that connects to the external service connector of the phone unit. Ordinarily, the phone unit connector is the standard connector of a premodified cellular phone, which enables hardwire communication, ie: power and data transmission between the phone unit and an external system. This connector is usually used to diagnose, service or reprogram the cellular phone.

It should be noted that the telephone unit in one embodiment is modified to include a clock/calendar chip. In addition to the existing integrated circuit found within commercial phones, such clock/calendar information is stored with the conventional information pertaining to the phone number called and the like.

The telephone interlink receiver functions as the computer telephone interface and enables a standard personal computer to communicate with the internal signal and data processing circuits of a minimally modified phone unit. In such an intermediary capacity, the interlink receiver assists the processing unit, preferably a personal computer, in accomplishing basic housekeeping functions for the phone unit such as setting the time and date of the phone unit, reprogramming the phone unit, or, retrieving stored information necessary to calculate charges. Together with the processing unit, the interlink receiver determines other aspects of a phone's function and use or restrictions in the function and use, appropriate for a rental service or other controlled service use.

The telephone interlink receiver utilizes an internal microprocessor and interfacing means for interconnecting the telephone unit and the central processing unit. The translation means is also included for establishing protocol relative to the signals received from the telephone unit to permit communication of telephone unit signals to the microprocessor and, eventually, to the central processing unit. The translation means may be programmed with software or firmware appropriate to the particular phone unit or cellular phone. The translation means may be erasable or reprogrammed at will, commensurate with the telephone unit being employed in the present invention. It is to be understood that the circuiting comprising the interlink receiver can be incorporated into the phone unit with the interlink receiver merely functioning as an interconnector between phone and computer, with the phone jacked directly into the serial port of the computer.

The central processing unit in the rental embodiment comprises a dedicated personal computer that is programmed with the necessary control routines to operate the system. In general the central processing unit is a stand-alone component and need not be connected to a centralized information processor.

However, if one or more local central processing units are connected to a centralized processor the operating protocol can be such that operations management is shared between the centralized information processor and the linked central processing unit or units. In this manner certain functions may only be performed through the centralized processor, such that global or system wide changes can be effected from a single source, or, in some situations, to prevent or limit inadvertent or unauthorized alterations to system operation or billing records at the local level.

The central processing unit includes connected peripheral components, most importantly a receipt printer which can generate a detailed instant rental invoice or slip incorporating a rental agreement or a detailed sales receipt and service contract. On return of a rented cellular phone unit the printer can generate a return agreement with an instant statement of charges, including charges from commercial common carriers, cellular network operators and, importantly, rental schedule charges. With the improved capability of the subject system the latter accounting can include special charges for use out of the home base system, (roaming charges), for use in distant zones with a distant home base, as defined by the rental operator, real time charges, and other extraordinary charges or surcharges based on the newly available information generated by the subject improvements to cellular phones.

Because the cellular phone unit is an expensive item and is an instrument that can incur substantial long distance charges, additional peripheral equipment for automatic credit card reading can be included for verification of credit sufficient to sustain loss of a phone unit or potentially high commercial carrier charges during use. The credit card reading equipment is connected to the central processing unit to transfer credit information to storage, verify credit by a modem that accesses a credit bureau and prepare credit card statements after authorization of charges. The credit verification means is used in conjunction with any programmed charge limiting criteria, or call limiting criteria, for restricting phone use to insure payment. Certain of the features of the rental system can be utilized in the cellular telephone distribution system. For example, the credit verification feature including the credit card swipe component is advantageously employed when the cellular phone is sold to the ultimate user at a retail outlet or service enter of a service provider.

The programming, distribution and tracking system of the expanded modification, issues and tracks mobile communication units from the distribution of the unit to the assignment of the unit to an ultimate subscriber and his selected service provider network. In addition to managing the distribution, group programming, testing, and ultimate assignment of the units to a customer, the system activates and encodes the unit for use with the specified service provider and end user providing both paper documentation and a computerized audit trail.

The tracking system is particularly adapted to cellular telephones and includes a multilevel data acquisition and management system that provides the necessary accounting and security features for optimized distribution of cellular telephones of different manufacture to customers of multiple or individual phone units. The system includes a computerized central information processor and complimentary, interlinked subprocessors at the service center level and retail delivery level as needed by the system user. The system is sufficiently flexible to be used by a distribution outlet that provides the programmed and activated phone unit to the ultimate end user or by a cellular telephone service provider that provides or acquires phone units for its subscribers.

The computerized tracking system enables a customer to obtain a cellular phone with virtually no paperwork, delays or programming problems and enables activation under a customer selected service plan. The tracking system is particularly useful for a cellular service provider or use in conjunction with a cellular service provider and includes the desirable anti-churning feature to prevent switching of service providers without the acknowledgement and action of the service provider. At the level of the central information processor, the system is networked with existing customer acquisition systems and correlates customer verification and accounting data with cellular unit transaction data. A customer database and a cellular phone unit database are coordinated with an interlink key that enables a variety of standard and custom management reports to be generated.

A primary feature of this expanded tracking system permits the former tedious task of individually programming and testing cellular telephones through the keyboard of the unit to be avoided. Even the improved system for programming and communications with a cellular telephone through the interlink receiver required phones to be programmed one at a time. In the improved extended system, the MIN parameters and phone activation can be automatically entered through the telephone interlink receiver as previously described, or the system user can gang program and test multiple phone units and coordinate the assignment of the phone units to individual or group customers as described in the expanded system. The phone units are activated and transactions related to each unit are tracked until the phone unit is no longer the responsibility of the distributor or network service provider.

The tracking system is particularly useful for cellular service providers to manage the initial acquisition, distribution and use of mobile phone units in their cellular service network. The tracking system integrates easily into existing customer acquisition systems and includes a relational database that is easily accessible and shared by existing systems.

These and other features provide the necessary accountability and security for operating a high volume cellular telephone distribution and tracking system.

DESCRIPTION OF THE PREFERRED EMBODIMENTS

Figure 1:
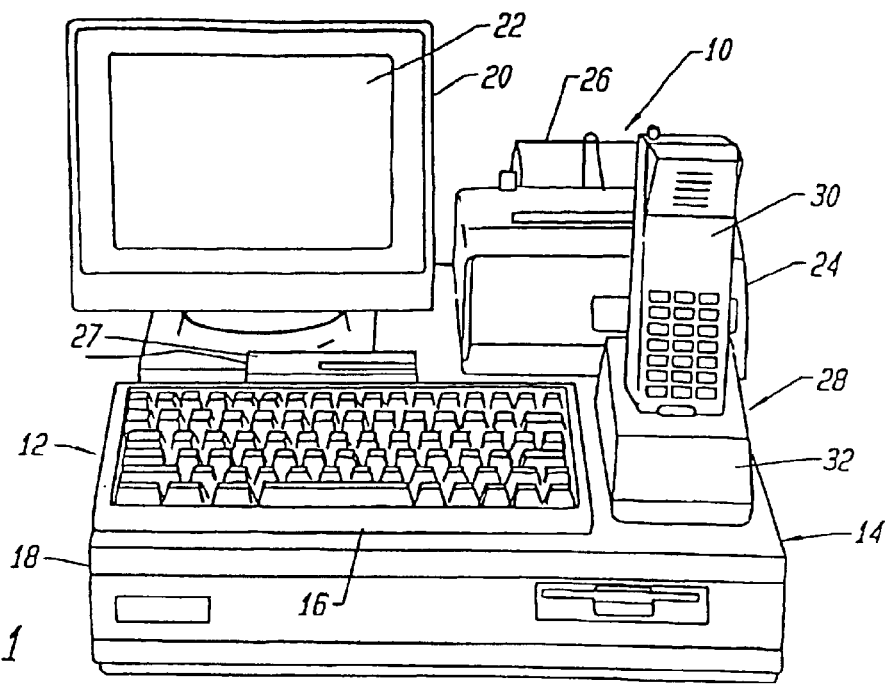
FIG. 1 is a perspective view of the components of a first embodiment of a mobile phone accounting system.

Referring to FIG. 1, the cellular telephone accounting system of this invention is designated generally by the reference numeral 10 and is shown in the configuration of a stand-alone, tracking and accounting unit 12. The tracking unit 12 includes a central processing unit 14 that combines a data entry keyboard 16 coupled to a controller or data processor 18 which in turn is coupled to a monitor 20 having a display screen 22 for tracking data entry and review. Also connected to the processor 18 are peripheral components including a printer 24, here with a continuous paper roll 26 for printing statements, receipts, customer contracts and the like, and a credit card reader 27 for credit verification.

Included in the cellular telephone accounting system is a telephone interlink receiver 28 shown with a coupled, handheld, cellular phone unit 30. The interlink receiver 28 structurally forms a boot 32 into which the cellular phone unit 30 is inserted at the time of check-out or rental, and at the time of check-in or return. The interlink receiver 28 comprises the interface component between the central processing unit 14 and the mobile cellular phone 30. It is to be understood that the tracking unit 12, even as a stand alone system, generally includes a plurality of phone units 46, each with its own telephone number and equipment identification number and assigned cellular area system number.

Figure 2:
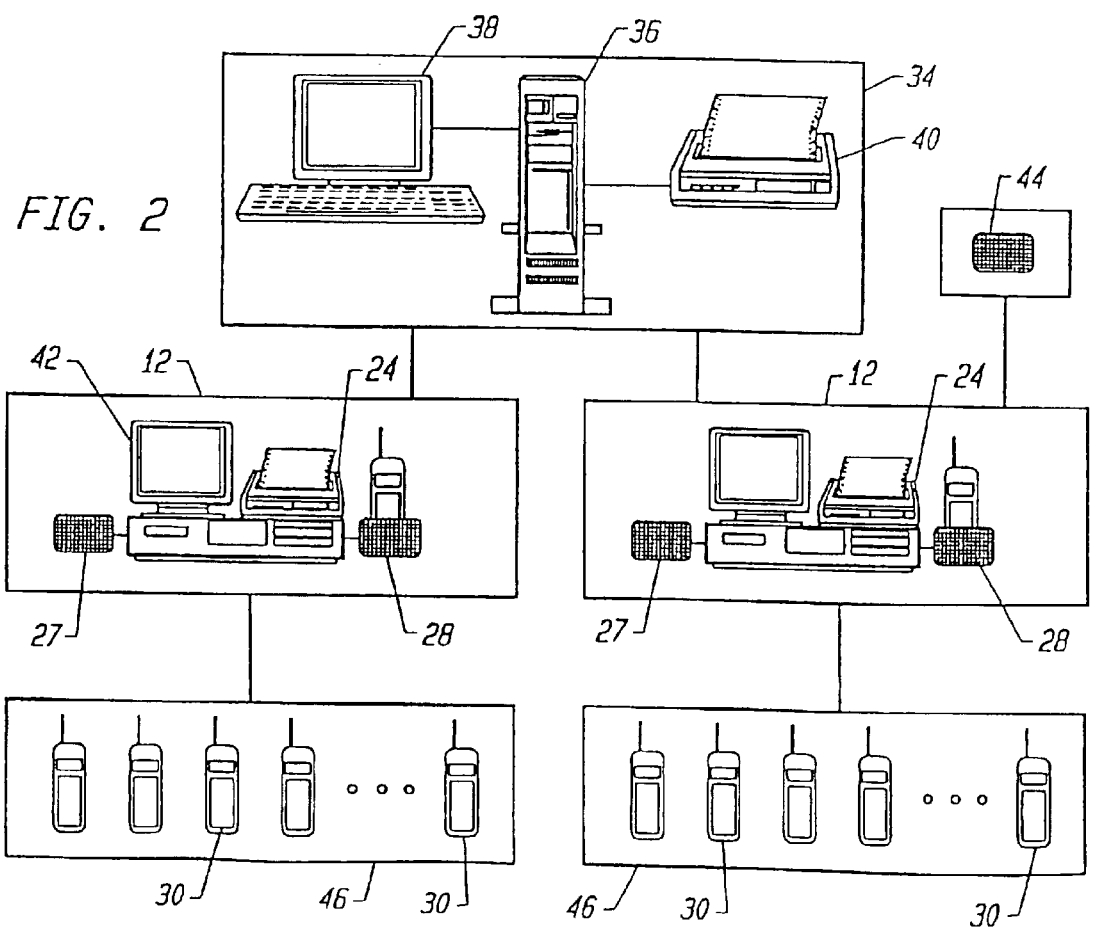
FIG. 2 is a schematic illustration of a second embodiment of the mobile phone accounting system with a centralized processor.

As shown in FIG. 2, the preferred system for a rental operation having multiple rental sites includes a centralized processor 34, including a controller 36 with a large memory acting as a centralized database for record keeping, an input/output console 38 for entering data and reviewing files, programs, etc. and a printer 40 for generating reports and hard copy records. The centralized processor should comprise at least an IBM 386 or equivalent personal computer with an internal modem and large memory. The centralized processor 34 removes many of the operational tasks from the plurality of local tracking units 12, enabling the tracking units to provide the necessary operations for site rentals, but removing to the centralized processor the programming and scheduling functions.

In this manner, changes in rate structures, in procedures or in the type of information collected can be accomplished throughout the served system. Additionally, centralizing many operations removes the ability to inadvertently or deliberately tamper with procedures or billings and allows implementation of various security measures for the local sites.

Each of the tracking units 12 comprises a personal computer 42 such as an IBM 286 or compatible, a rental agreement and invoice printer 24, and a credit card reader 27. The tracking units 12 are connected to the telephone interlink receiver 28 to which phone units from the inventory 46 are connectable to link the phones with the computer 42. The tracking units communicate with the centralized processor continually by a file server type network or periodically by a modem link through commercial telecommunication systems. A second dedicated modem, (not shown) located internally in the computer 42 also allows the credit card reader to communicate with a service bureau 44 for credit verification.

A cellular phone unit inventory 46 is associated with each tracking unit 12 and includes individual phone units 30 identified for assignment to a particular tracking unit home base. Records of reassignment of phone units when returned to different sites or when transferred to more popular rental sites is desired for proper inventory control. Internal systems programming tracks the phone units and includes procedures to track the location of the units during use. To insure that roaming charges are appropriately calculated relative to a particular home base, cellular area system identification numbers are stored on each call or periodically when switching from one area to another.

Figure 3:
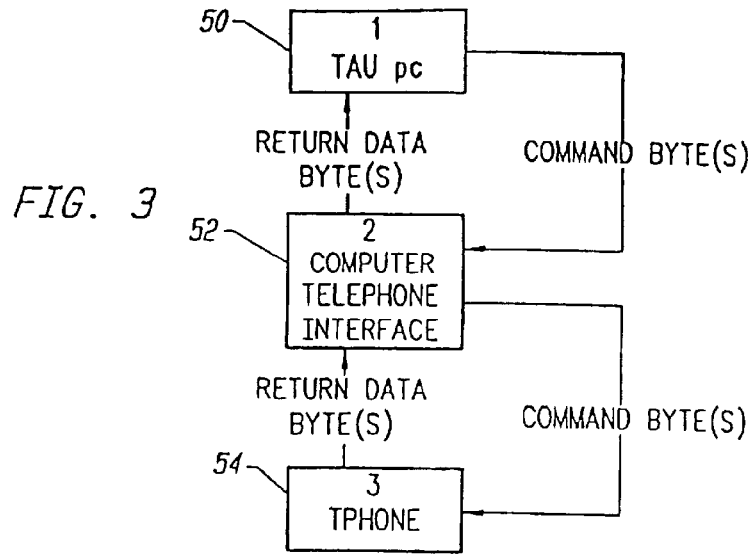
FIG. 3 is a schematic block diagram of the command hierarchy of the major components of the system.
Figure 4:
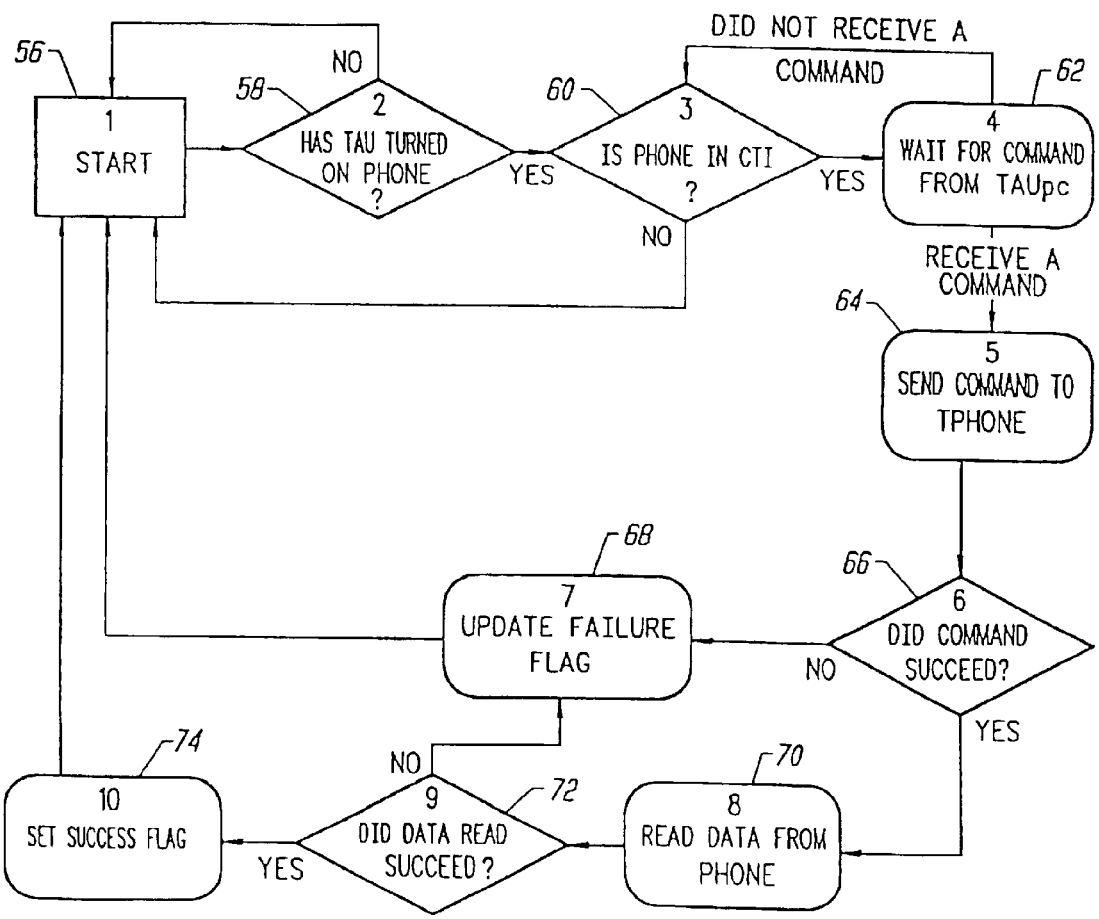
FIG. 4 is a schematic block diagram of the command line interface between the computer and interlink receiver.
Figure 5:
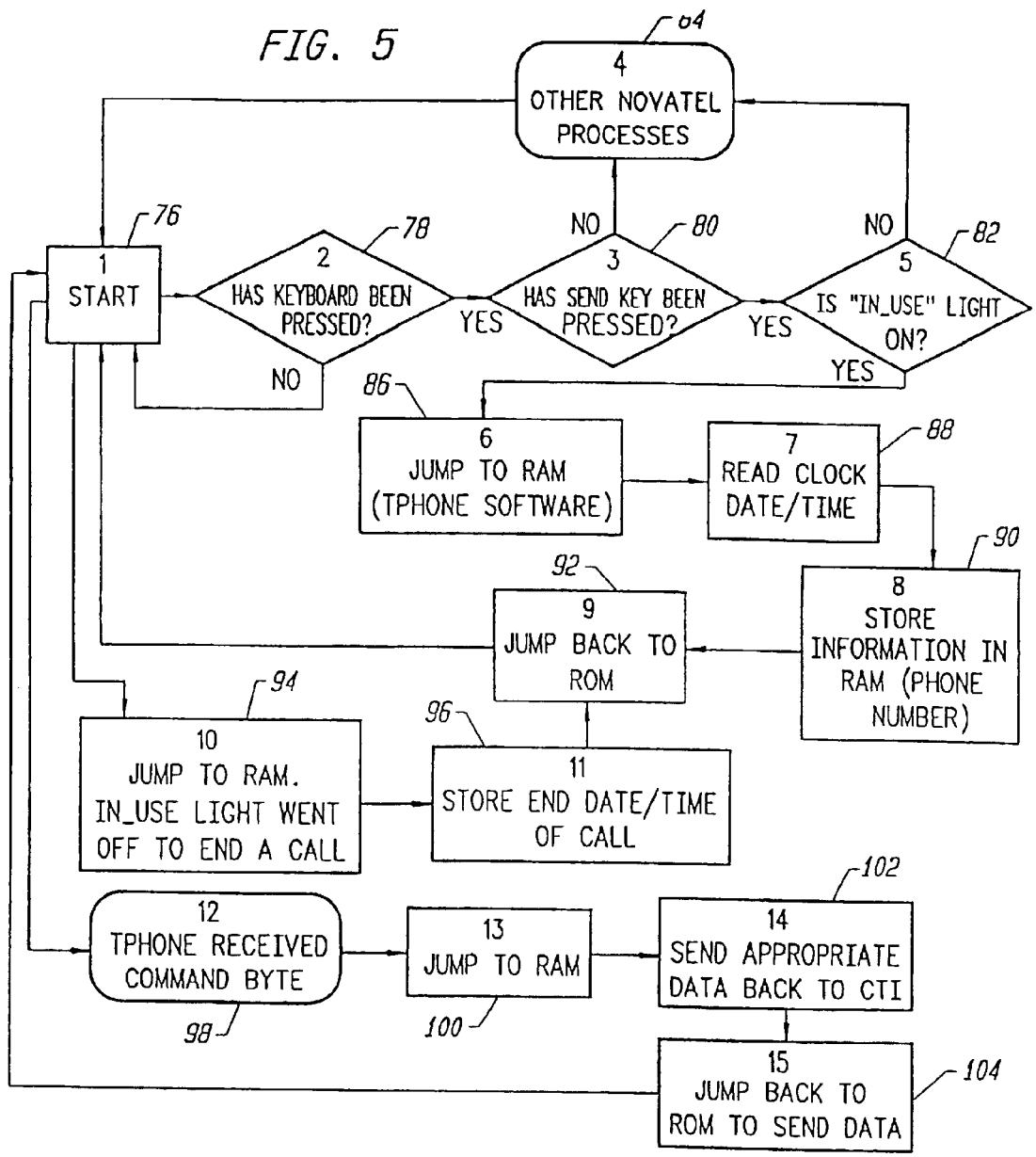
FIG. 5 is a schematic block diagram of the command line interface between the interlink receiver and the mobile phone unit.

Referring now to the schematic diagrams of FIGS. 3–5, an overview of the operation of the interlinked components of the cellular telephone accounting system 10 is shown. In FIG. 3, the command hierarchy is depicted with the tracking and accounting unit 12 (TAU), Box 50, sending command bytes to the computer telephone interface (CTI) Box 52, in the form of the previously described telephone interlink receiver 28, which translates and relays the appropriate command bytes to the Tphone, Box 54, which is one of the cellular phone units 30 electronically connected to the interlink receiver 28.

Figure 8:
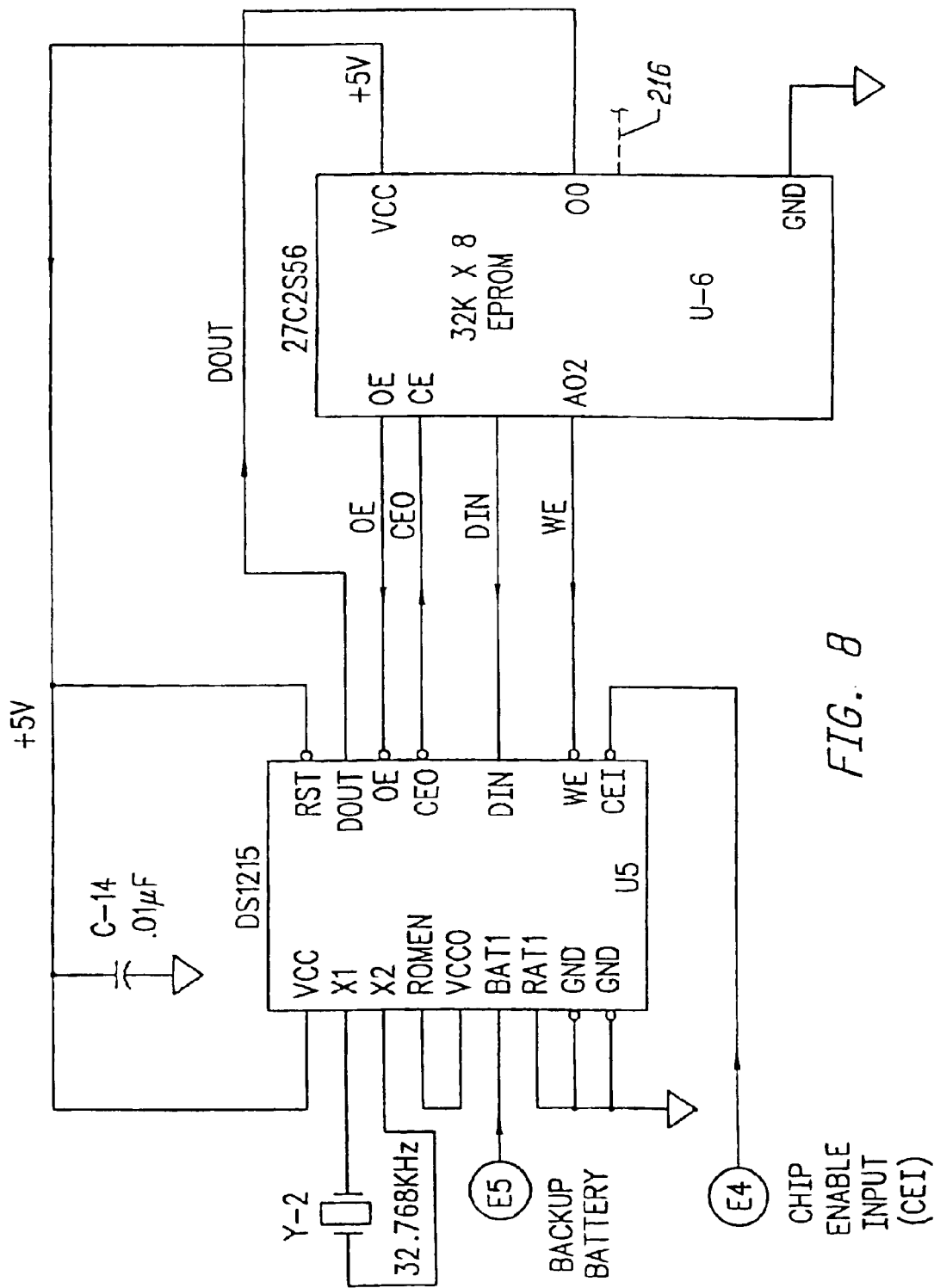
FIG. 8 is an electrical schematic depicting a portion of the telephone unit circuitry and modifications made to the same.

In an exemplar system, a Novatel PTR800A cellular phone was modified by inclusion of a real-time clock chip, U5 in FIG. 8, integrated into the cellular phone processor with a rededication of a part of the memory store in the cellular phone EPROM memory chip to accommodate operating system code and data storage for the new functional capabilities of the phone unit.

The computer initiated command bytes, when engaged in data retrieval, are relayed to the Tphone 54 by the CTI 52, with any modification or translation, necessary to accommodate particular operating system and data code in a particular manufacture of cellular phone, triggering a data dump or data read of stored information and check of any settings such as the real time clock and non-resettable cumulative counter. The data retrieved by the CTI 52 is passed to TAU with any modification or translation to the data necessary for compatibility with the interface standards set for the TAU system particularly in a multi site network where differently configured phones may be used from site to site.

The return data bytes are processed by the TAU computer, for site activities involved in the rental transaction, and in systems having a centralized processor, stored and passed to the centralized processor when the local unit is periodically interrogated by the centralized processor.

Referring to FIG. 4, a simplified command protocol is diagrammed to outline the data retrieval process at the CTI. At the start, Box 56, an inquiry is made to determine if the TAU has turned on the Tphone for interrogation, decision diamond 58. If no, it returns to its start state. If yes, then an inquiry is made to determine if the cellular phone is in the CTI, diamond 60, and engaged on the connecting terminal to be electronically connected to the CTI. If yes, then the system is set to receive a command from the TAU, Box 62. When a command is received the TAU relays the command to the Tphone, Box 64 and a check is made to determine if the Tphone received the command, diamond 66. If no, a failure flag update message, Box 68, is relayed to the TAU, and if yes, the read data message is passed to the Tphone, Box 70, to extract the desired information from the Tphone.

If the data read is a success as queried at diamond 72 the success flag is set, Box 74, and if no, the failure flag is set. A failure flag message will prompt the rental operator to remove the phone from service for repair servicing or special procedure interrogation to recover any sought for data, particularly if Tphone is being interrogated after a rental return.

Referring to FIG. 5, a simplified command protocol is diagrammed to outline the procedure occurring in the modified cellular telephone. It is expected, however, that the subject modifications will be incorporated in the cellular telephone upon manufacture.

From start, Box 76, one of several paths is directed to the decision diamond 78 where it is determined whether a telephone call is being initiated. If no, a return loop goes back to start, Box 76. If yes, it is determined if a send key has been pressed at diamond 80 which indicates an outgoing call. If yes, a check is made at diamond 82 to determine if the "in use" light E-1 FIG. 7, is on, indicating a completed call connection. A no at either the send key decision or light on decision will result in looping to existing internal phone processes at Box 84 with a return to a start, Box 62.

If the phone is in use the interrogation path jumps to RAM where the control code for initiating the internal record keeping procedures resides, Box 86. Instructions are initiated to read the clock and calendar, Box 88, and retrieve any cellular system identification number and switching data, if the phone is not already storing such data in its own memory. The recovered data is temporarily stored in reallocated RAM, Box 90 together with the phone number and other pertinent data for feedback to the CTI callup. The path then jumps back to ROM, Box 92, for coordinating system operation procedures of cellular phone with the real time data collection and store before returning to start, Box 76.

In a second path from start, Box 76, when the in use light goes off signalling the end of a call, the jump to RAM, Box 94 initiates the program instructions to store the time and data of the call end, Box 96, enabling calculation of an outgoing call duration or identification of the time and date of an incoming call together with the cellular system identification number, if desired. A jump back to ROM 92 returns the control to the internal control circuitry of the phone.

Finally, on placing the phone in the interlink receiver 28, a telephone received command byte, Box 98 results in a jump to RAM, Box 100 where the program instructions to recover and relay the stored data are initiated. This stored data, including the cellular system identification number in the cellular network system, stored in RAM, is sent back to the CTI, Box 102 using the system protocol of the phone unit, Box 104.

If the cellular system identification numbers are logged by the existing operating system program of the phone, the newly programmed interrogation instructions need only locate the data store, recover and transmit the data to the CTI for relay to the TAU. The TAU by its own modifiable internal program defines use zones and translate cell locations to use zones for calculation of use surcharges, for out of home base roaming calls, and/or, for monitoring the location of use. Alternately to monitor use, the real-time clock circuit can trigger periodic inquiries to the memory store of current system identification number and record changes in the number in a memory location accessible during data transfer.

In a mobile, cellular telephone network, cellular areas are given a system identification area number (SID) similar to national telephone system area codes. Each phone in addition to an assigned telephone number includes a unit identification number or called the Electronic Serial Number (ESN) and an initially assigned home system identification number (SIDH) that identifies the unit as associated with a particular cellular area (SID). Usually this SID is the rental site as the home base from which roaming calls are calculated, but may be another location. In the metering of calls, for proper crediting of the systems area operator, calls are logged with (SID) number providing a means of noting from which system area, as well as area code, a call is made, while "roaming" away from a home base. In that manner, the phone companies can bill a cellular phone wherever it travels.

By storing and accessing this information and coordinating data with real time call records, monitoring the location of the phone unit during its period of use is accomplished by any of several programming procedures.

Figure 6:
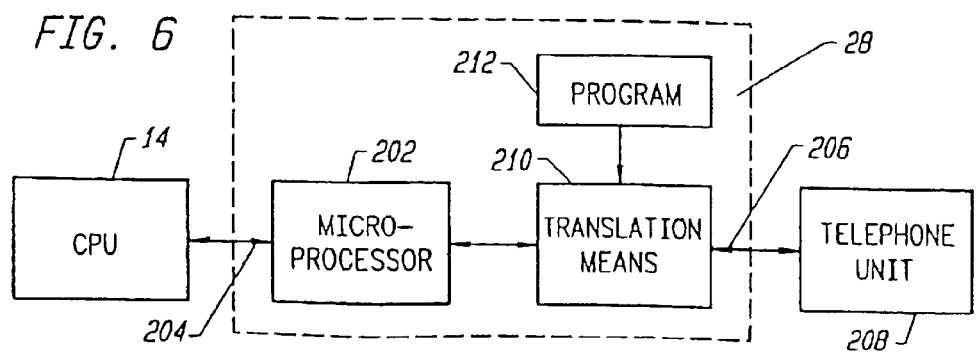
FIG. 6 is a block diagram indicating a general flow of data through the telephone interlink receiver.
Figure 7A:
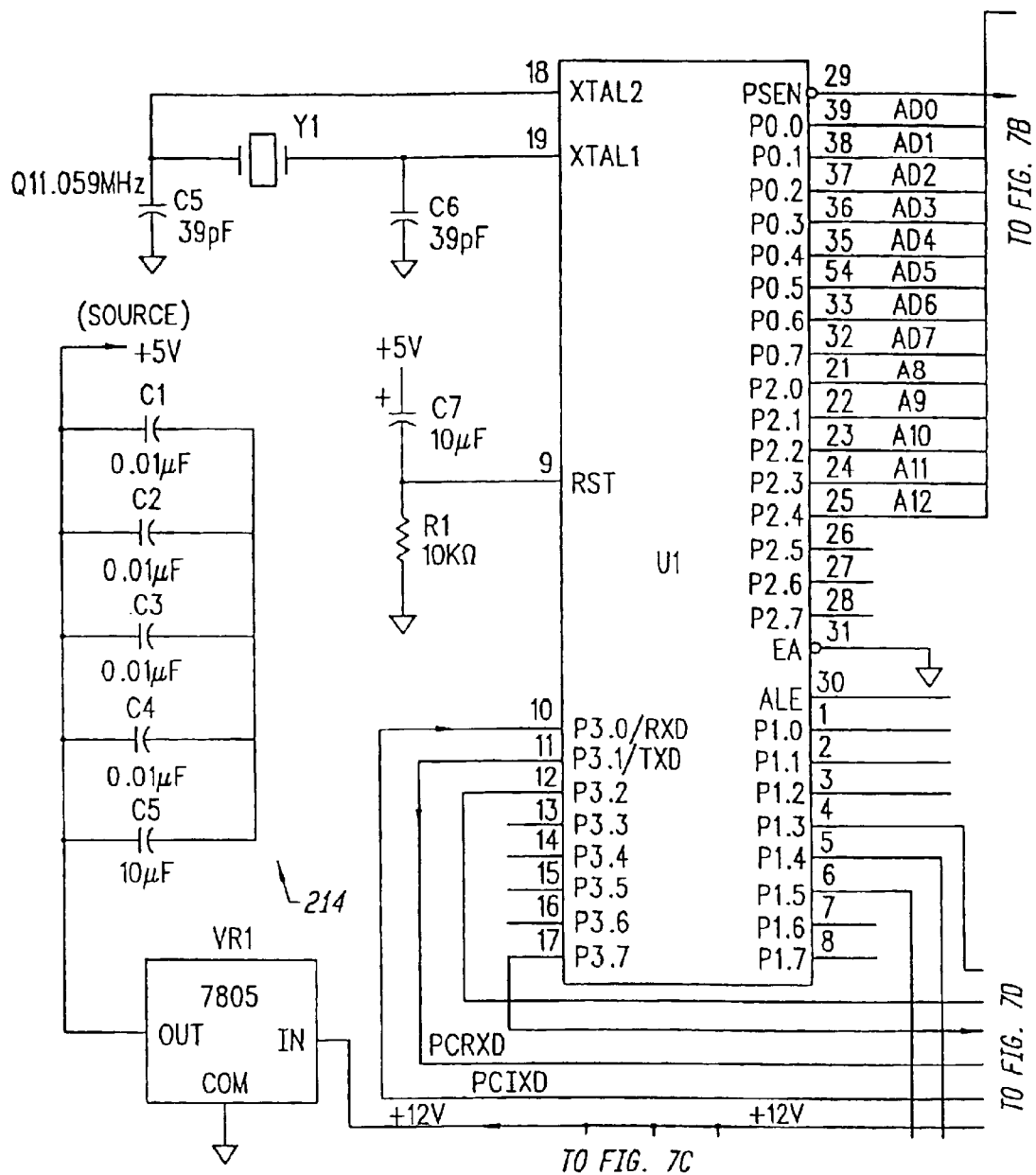
FIG. 7 is an electrical schematic of the telephone interlink receiver and the interface between the telephone unit and central processing unit.
Figure 7B:
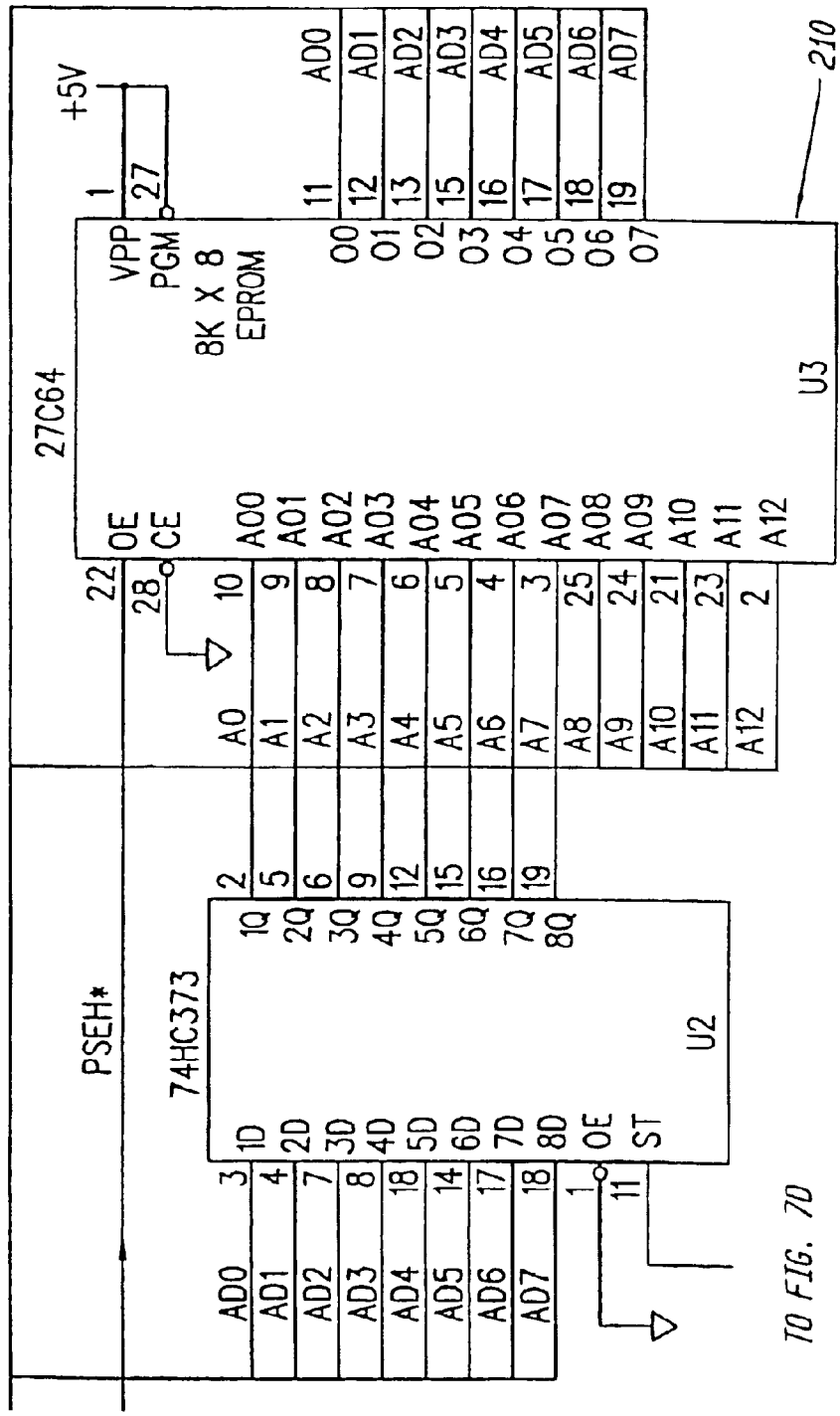
Figure 7C:
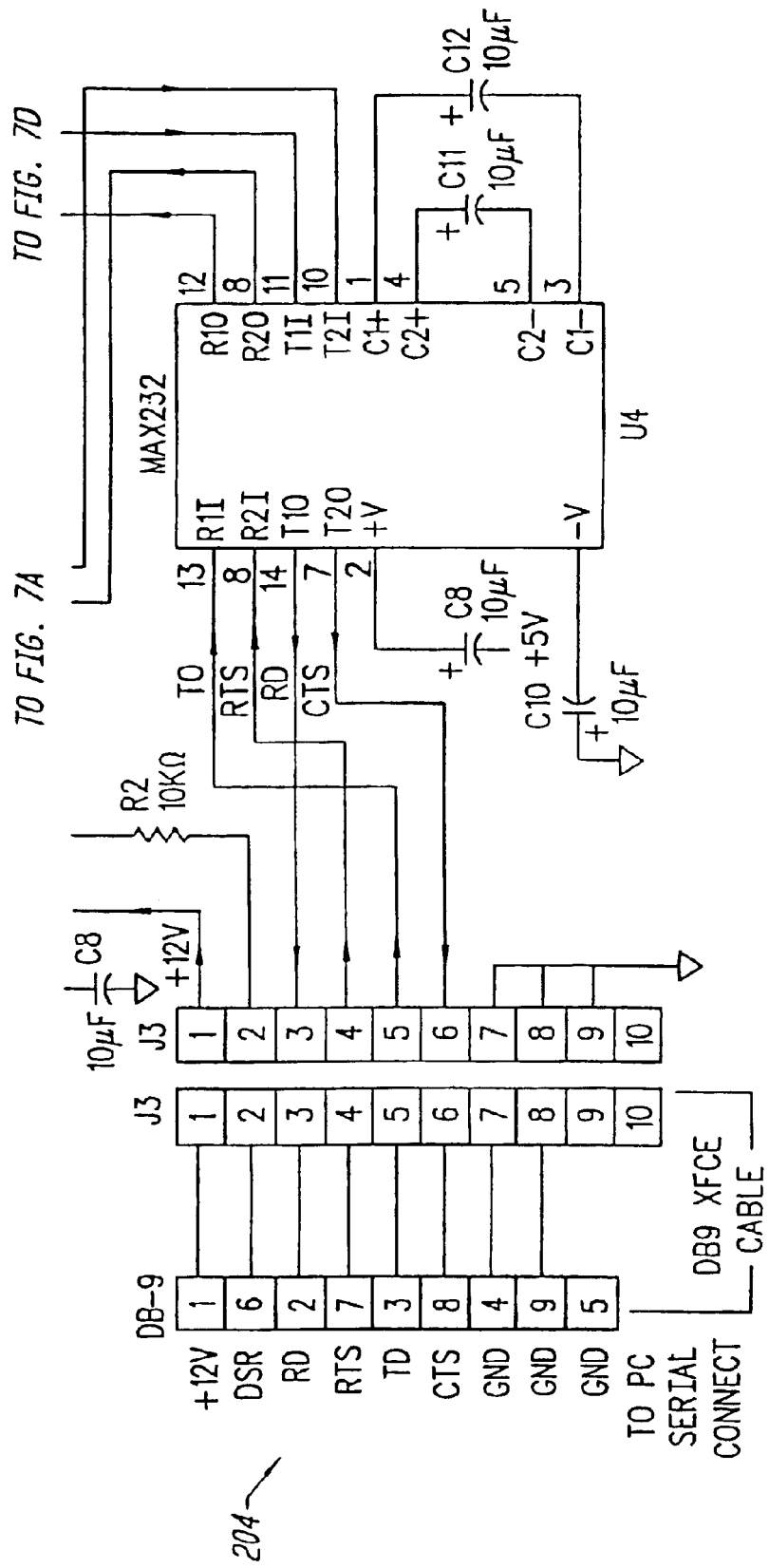
Figure 7D:
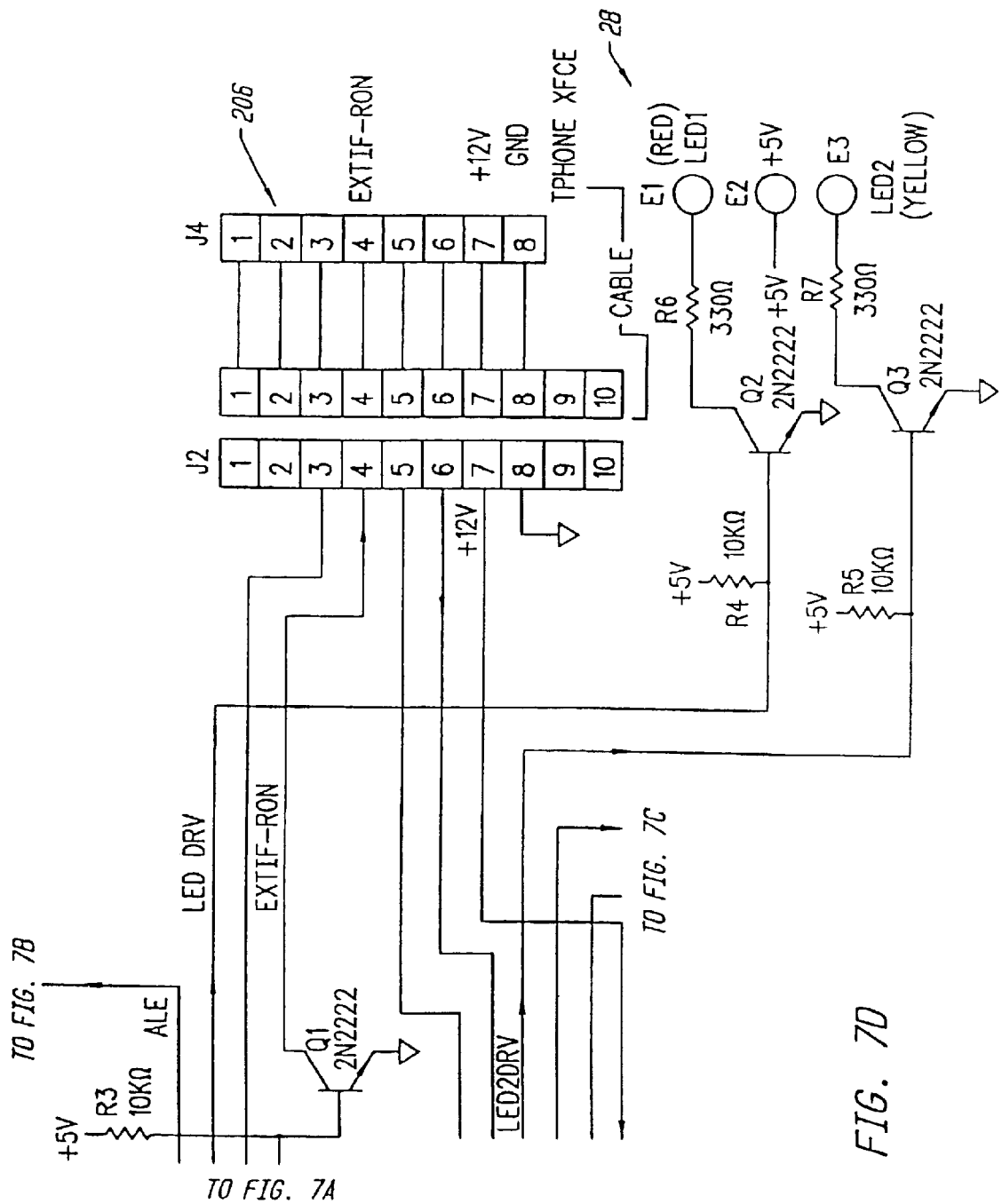

In the example given, modifying a Novatel PTR800A phone 208, FIGS. 6 and 8, the program code is not stored in ROM, because there was no room, but stored in a dedicated section of RAM. In operation, as described with reference to the flow charts, patches were used to jump out of ROM to RAM to implement the new program procedures. Similarly, certain features of the original phone, including a user call memory in RAM for storage of frequently called numbers, was coopted to store the new phone call data.

A redesigned cellular phone unit 12 preferably allocates system operation code to ROM, and includes an expanded RAM memory to retain common desirable features, while storing data on an expanded number of logged calls with the additional data for time and date provided by the incorporated real-time clock, and a correlated real-time record of (SID) data to establish the location of the phone during each logged call, and if desired, throughout its period of use.

With reference to FIG. 6, it may be observed that block diagram generally describes the interlink receiver 28. Receiver 28 is mounted within boot 32 which includes a microprocessor 202 communicating through a serial port 204 to the central processing unit 14. Interface 206 permit telephone unit 208 to communicate with receiver 200. As previously described the embodiment herein employs a telephone unit consisting of a Novatel cellular phone TR800A. However, it should be noted that any telephone unit may be employed herein with the present system 10. In this regard, translation means 210 is included in receiver 28 to establish a protocol within receiver 28, permitting data signals from telephone unit 208 to eventually reach central processing unit (CPU) 14 through microprocessor 202, using standard data formats such as ASCI. The program 212, in the form of software or firmware, is inserted into translation means 210 to accommodate the data signal characteristics of telephone unit 208. It should be noted that translation means 210 may be erasable and reprogrammable with any program when telephone units are substituted.

Returning now to FIG. 7, it may be observed that a schematic diagram is represented for receiver 28. At it may seen from FIG. 7, interface 204 from central processing unit 14 feeds into receiver 28 at J3. A 12V DC power source is also fed from CPU 14 passes through capacitor C8 and into voltage regulator VR1. The voltage regulator VRI reduces the input voltage from 12V to 5V by passing current through an output filter 214 consisting of capacitors C1, C2, C9, C4, and C13. The J3 input connects to process voltage convertor U4 which is capable of generating positive and negative voltages via capacitors C8, C10, C11, and C12. Microprocessor U1 interprets any data, as previously described, passing between CPU 14 and telephone unit 208. Multiplexer U2 receives signal lines from U3, depicted as an EPROM which serves as translation means 210. Software or firmware program 212 is superimposed on EPROM 3. The source code of a software program peculiar to the Novatel telephone unit 208 is enclosed herewith as an appendix to this application. Interface 206, also peculiar to the Novatel telephone unit 208, is depicted in FIG. 7 as J4. Again, the physical terminal or jack serving as interface 206 may be altered to accommodate any telephone unit. E1 (LED 1) is switched by transistor Q2 and indicates the operation transistor Q3 operates transistor E3 (LED 2) with a yellow light indicating interrogation between CPU 14 and telephone unit 208. Transistor Q1 turns telephone unit 208 on and off. Table 1 indicates components and abbreviations employed in FIGS. 7 and 8.

With reference to FIG. 8, it may be observed that a portion of the circuit board added to the Novatel PTR800A phone unit 208 is depicted. The EPROM U6 essentially identical to the EPROM employed in the Novatel phone unit 209 except the tip missing 216 pin (–) has been removed. A clock chip U5 has been added, including a crystal Y2. Thus, the clock/calendar information travels between the pins marked VCC of chips U5 and U6 via the tuning capacitor C14. Thus, the unit 208 has been altered to provide clock/calendar information, together with prior information available in phone unit 208, to interlink receiver 28 and CPU 14. Table 2 represents a list of certain components employed in the schematics depicts in FIGS. 7 and 8. It should be noted that additional software or firmware is programmed into the EPROM of U6 and is provided herein as a portion of the appendix.

TABLE I

ABBREVIATIONS

| XTAL—crystal | E—enable |
| PSEN—program strobe | PCRXT—pers. computer receive data |
| P—port | PCTXD—pers. computer transmit data |
| RST—reset | ALE—address latch enable |
| DSR—data set ready | A—address |
| RD—receive data | LED—light emitting diode |
| RTS—ready to send | AD—address and data line |
| TD—transmit data | DRV—drive |
| CTS—clear to send | WRON—telephone unit |
| GND—ground | XFCE—interface |
| DB—connector | CE—chip enable |
| OE—output enable | PGM—program |
| VPP—power supply chip | I—in |
| O—out | D—data |

TABLE II

COMPONENTS

| U - 1 | Microprocessor 80C31 |
| U - 2 | Multiplexer 74 HC 373 |
| U - 3 | EPROM 27064 |
| U - 4 | Process Voltage Converter Maxum 232 |
| U - 5 | Clock Chip DS1215S Dallas Semi Conductors, Dallas Texas |
| U - 6 | EPROM 27C2S56 |

Telephone Unit 208 Novatel PTR800A Ft. Worth, Tex.

In use, in the situation of a rental operation, a customer indicates a desire to rent a cellular phone and presents a credit card. The rental agent activates the display screen by a key touch to change from a screen saver display to a main menu, selecting the "rent a phone" option. The agent then selects a "new customer" option and enters the customers name, address, driver's license number and other information desired by a predevised field based data format. The agent then swipes the customer's credit card through the slot in the credit card reader to record credit information and automatically dial-up a service bureau through a dedicated internal modem in the local computer, called the tracking and accounting unit (TAU). Upon verification of card validity and credit limitations, if any, the TAU prompts the agent to place a phone in the boot of the telephone interlink receiver. The phone is initially off and the interlink receiver powers the phone, unlocks it, and checks the phone Electronic Serial Number (ESN) and telephone number, checks the cumulative call counter, checks the setting of the real-time clock in the phone and resets the call memory.

The TAU prints out the rental agreement, which in part is preprinted, adding the new information identifying the customer and phone being rented, the number of batteries provided, and any other transaction or credit information desired. The customer signs the agreement and a copy is retained by the agent who logs the phone as in-use.

The phone for rental operations may have international, 900 and 876 numbers blocked. Additionally, the phone may have the number of calls limited by customer agreement, or because of memory capacity in storing the time of the call, the duration, the called number for outgoing calls, and the SIDH number, identifying the cellular system area called from. A conventional cellular phone without specifically added memory can store data on about 200 calls.

After use, the customer returns the phone to the rental site. The agent selects the "phone return" option in the screen display menu. The agent is again prompted to place the phone in the boot of the telephone interlink receiver. The interlink receiver reads the call memory, clears the call memory, locks the phone and transfers the information to the TAU.

The TAU calculates the bill, using the appropriate daily rate, local calling charge, roaming charges, roaming call surcharges, long distance tariffs, long distance markups, international rates, taxes and any other charges such as lost batteries, etc. The TAU calls the credit card service bureau and requests payment authorization. The TAU prints out a Final Agreement Invoice with a detailed call list, and list of charges for the customer. When the customer signs the invoice, the TAU records the rental as complete.

Periodically, under central operator control, the centralized information processor calls the local site TAU over a dial-up line. The centralized processor polls the TAU for records of all completed rentals, inventory data and provides the TAU with tariff and other operating data updates. The polling of local site TAUs is usually performed late-at-night as the TAU is disabled during interrogation. The centralized processor compiles and prints daily and weekly reports on individual sites, recording daily and weekly business, phone usage, inventory, overdue phones and revenues. The centralized processor compiles composite reports on all site data to provide a current overview of the rental operation.

Similarly, the TAU on operator demand generates reports for the individual rental office to provide current and cumulative hard copy records on the business.

Experience in the field of rental of cellular phones has resulted in the recognition of many problems that arise in the temporary assignment of phones to users. Processing of the necessary paperwork at the rental office, checking the user's credit and tracking the cellular telephone with accurate accounting for calls, including an extra layer for rental charges have enabled solutions to be devised for the different, but related field of cellular phone distribution. The new problems of activating telephones, often from different manufacturers, and delivering the phones to an ultimate user under a subscription agreement with a cellular phone service provider are advantageously resolved by the tracking system for distributed cellular telephones as herein described.

Figure 9:
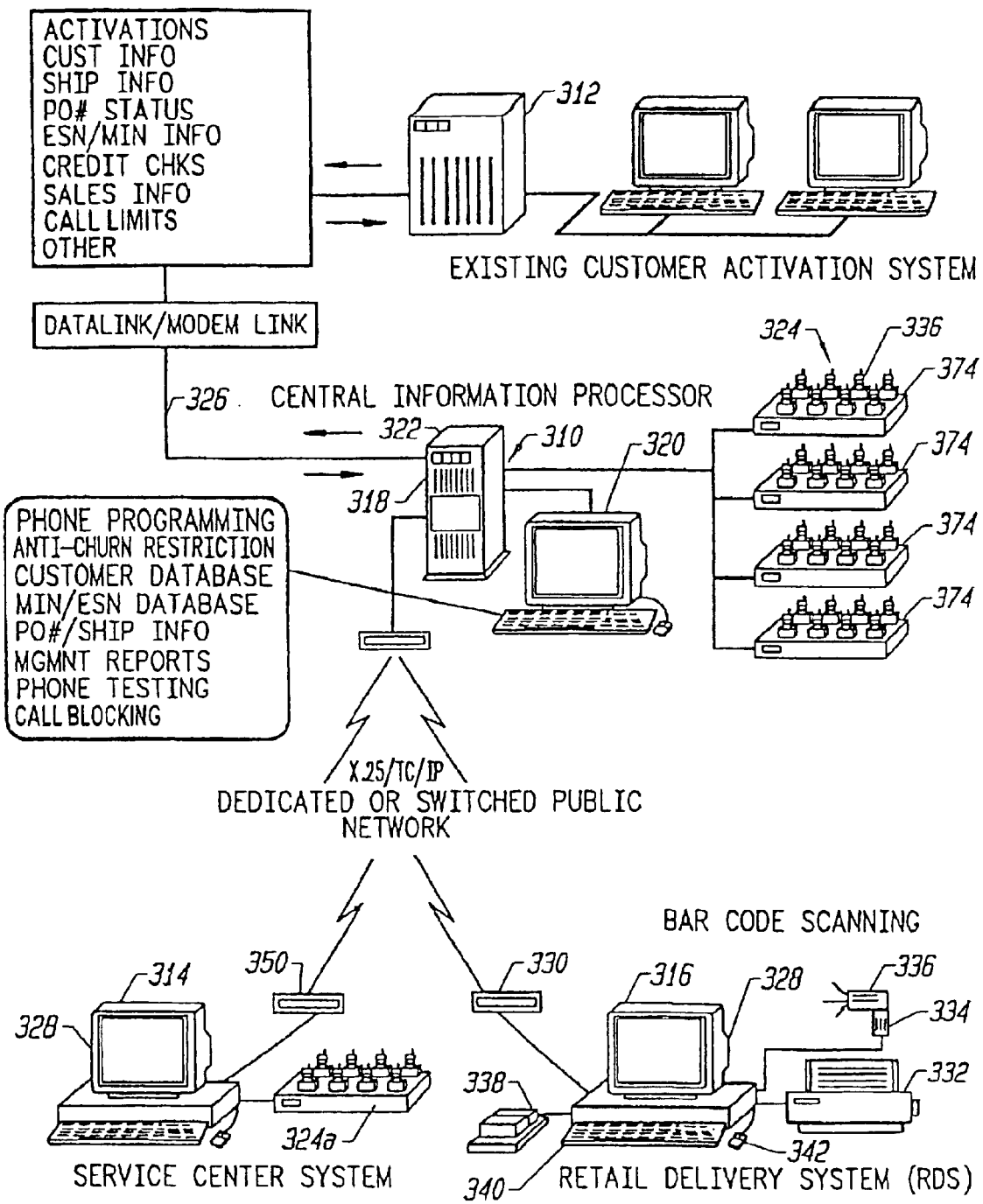
FIG. 9 is a schematic drawing of the distribution and tracking system of another embodiment of the invention.

Referring to the diagrammatic view of FIG. 9, the programming, tracking and accounting system for distributed mobile communication devices, here mobile phone units 308, is designated by the reference 310. The programming and tracking system is shown coupled by a communication link to an existing customer activation system 312 used, for example, by a cellular telephone distributor, retailer or cellular network service provider. Frequently, the cellular telephone distributor is the cellular system service provider, and not only issues phones to customers and subscribers, but tracks the telephone usage by the subscribers.

The mobile telephone tracking system 310 may, however, be utilized as a self-contained, mobile telephone distribution system that issues telephones from a variety of different manufacturers to customers in conjunction with one or more service providers. In this system, by pre-arrangements with the service providers, the customers can be issued an activated mobile phone and subscriber's contract for service at a single location.

The mobile telephone tracking system 310 is shown networked with optional subsystems including one or more service center systems 314, and similarly, one or more retail delivery systems 316. The core of the mobile telephone tracking system 310 is a central information processor unit 318 that includes a data input and output module 320 and file server tower 322. It is to be understood that any capable hardware system having networked, file-server capabilities may function as the central information processor unit. It has been found that a 486DX50 mHz central processing unit with a Unix operating and networking system including a SCSI 300 mb hard drive and an accompanying file server tower provides an economical hardware system for managing most mobile phone acquisition, programming, testing and issuing operations of the expanded system.

The central information processor unit 318 includes an internal modem that communicates via a data link 326, for example commercial telephone lines, to the customer activation system 312 which includes the customer data base and accounting system of the phone distributor or service provider.

Where desired, additional terminals can be connected to the central information processing unit for acquisition and transfer of data from remote sites. The central information processing unit 318 also includes a series of gang platforms 324 for programming and testing groups of mobile phones simultaneously.

In one preferred embodiment, a single central information processing unit 318 includes eight different interfaces for programming cellular phones from different manufacturers and can program up to 128 phones at one time when grouped by manufacturer and/or model number. This feature is particularly important for mobile phone distributors who have heretofore been required to activate telephones individually through a painstakingly slow process using the telephone keyboard. Automatic programming and testing of cellular phones in batches substantially reduces error input, the time for programming and testing, and the time for generating accounting records for tracking, inventory control and billing.

Far greater security is provided by automatic batch programming, since the group of phones programmed can be assigned all NAM (Number Assignment Module) parameters including SID (System Identification number), GIM (Group Identification Mark), and MIN (Mobile Identification Number). In the procedure of batch programming of telephones, the automated software includes a procedural command set that allows the programmer a degree of latitude in programming the phones, such that certain parameters, such as assignment of the MIN may be performed at the service center 314 or at the retail outlet 316. In this manner, the inventory of useable MIN's under control of the central information processor 318 is not depleted prematurely and valuable telephone numbers are not assigned until the phone is activated for use or delivered to the ultimate user.

Of particular importance, at the time of programming the batch of phones, the phones can be encrypted with an anti-churn code to prevent access to the manufacturer's "back door" entry code that permits reprogramming. In this manner, the programmed phone must be returned to an authorized service center to be unlocked for reprogramming. The ability to track and account for activated phones is thereby within the control of the distributor or his authorized agent.

The distributor will thereby be alerted to a service switch prior to the switch occurring. This provides the distributor (or service provider who is also the distributor or operating in conjunction with the distributor) an opportunity to determine the reasons for a service switch, and, if anything can be done to prevent a service switch. For example, correction of any dissatisfaction the customer may have with equipment operation, service or billing may enable the customer to be retained.

In addition to this marketing advantage, the anti-churn code enables the distributor to precisely determine when the phone unit is no longer the responsibility of the distributor, thereby expanding the marketing plan for acquisition of phones to lease or lease-purchase. During the process of reprogram unlock, the action is automatically reported to the central information processor unit and recorded.

The anti-churn feature also allows for greater security in the distribution of cellular phones within the tracking system. Telephones that are not fully programmed and await final assignment of a SID and/or MIN at the local service center or retail outlet cannot be finally programmed without access to the encrypted anti-churn code.

In FIG. 9, the retail delivery system 316 is shown with a computer 328 connected to the central information processor 318 via a communication link 330 that may be a dedicate or switched public network channel. The retail delivery system or retail outlet includes a printer 332 for printing customer forms and invoices, a bar code scanner 334 allows for rapid entry of data into the computer 328 that is associated with a particular phone unit 336 being scanned. The phone unit preferably has a bar code label that is keyed to the manufacturer's group identification number or the manufacturer's individual serial number (ESN) for that unit. Data related to the phone unit is thereby readily entered allowing access to the stored data about that unit or group to be accessed from storage in the local computer 328 or retrieved from the central information processor 318. The retail outlet 316 also includes a credit card swipe 338 such that the customers credit can be instantly verified and payments or present credit allocations entered by charge if desired. The computer 328 also includes a keyboard 340 and a data input mouse 342 allowing the customer sales representative to select menus and fields for entry of data relating to the transaction. Transactional data is returned to the central information processor 318 for correlation, processing and storage.

It is to be understood that the auxiliary components to the computer 328 may also be included at the location of the central information processor 318 or the service center 314, if phones are issued to customers or if hard copy records are desired to be generated.

The local service center system 314 is also connected to the central information processor 318 via a communication link 350. The service center 314 can be a satellite system to the central information processor allowing original batch programming or telephones in a gang platform 324 in conjunction with the central information processor 318, or be a supplemental system, where a local service area completes phone programming initiated by the central information processor. For example, where the service center is at a remote site of a cellular service provider and phones delivered to the center have been encrypted and preprogrammed with all NAM parameters, except final assignment of the MIN which the service provider draws from its locally available inventory of MTNs stored on a disk or in the memory of the local computer 328, final assignment of the MIN at the service center site may be preferred to protect the phones in transit and conserve available MINs. Alternately, the service center is associated with a retail delivery system that is a retail outlet for phones from a variety of different manufacturers that are delivered to customers of several different service providers. As such, the service center is required to selectively program phones for different service providers or reprogram phones when customers switch service providers or exchange phone units.

From the foregoing, it is to be understood that the system has sufficient flexibility to be configured according to the requirements of the user of the distribution system. A typical application of the distribution system is described with reference to the block diagram of FIG. 10.

Figure 10:
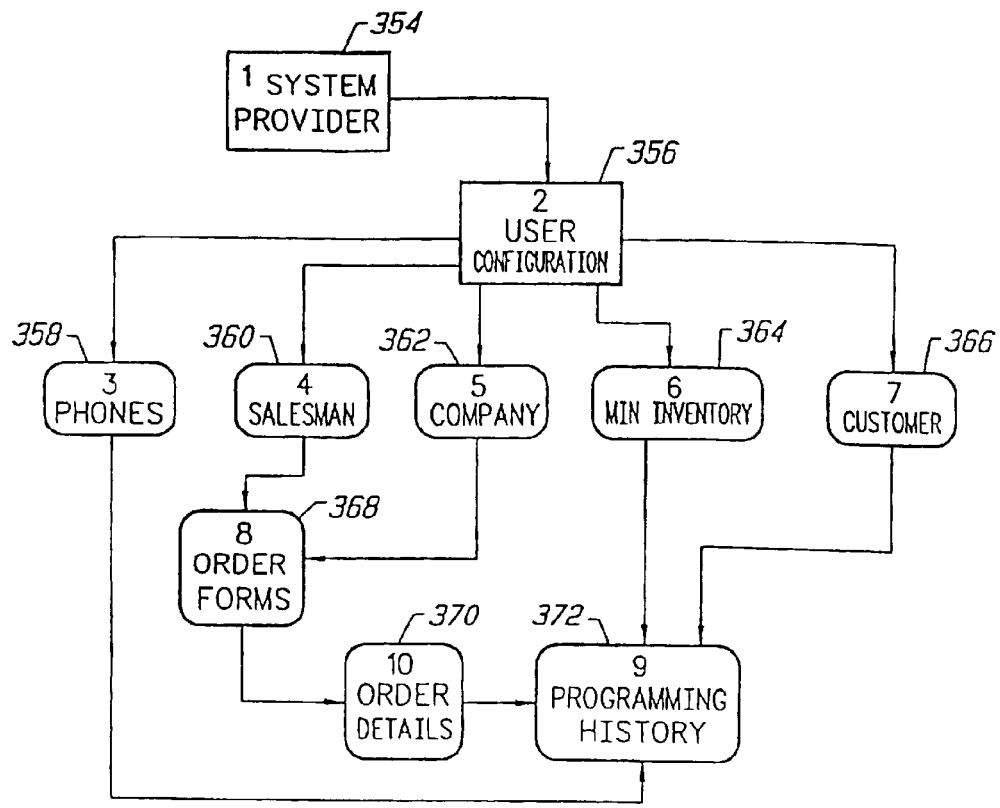
FIG. 10 is a block diagram of the system configuration of FIG. 9 for phone programming and data recording.

As shown in FIG. 10, the system provider 354 delivers a hardware and software package of the distribution and tracking system to a system user 356, in this case, a cellular phone distributor. The system user enters currently known data into the five major directories, i e., phones 358, salesmen 360, company 362, MIN inventory 364, and customer 366 to set up a current system.

The directory for phones 358 includes a database with the necessary data fields to identify the inventory of phone units passing through the system from the phone manufacturer to the ultimate customer or user. The database includes the manufacturer's group identification mark (GIM), number of units available, the manufacturer's electronic serial number for each unit (ESN), pricing data, access or locking code for programming and other data related to the phone units or phone manufacturer.

The directory for the salesman 360 contains a database with the identity of all agents and representatives of the system user who have access to the system directories and their level of access. For example, some representative may be able to initiate the sales and invoicing of a group of phones to a company, but a second representative may be required to program and ship the phones. Additionally, access to the access code for programming or credit information of a company or customer may be limited according to the security requirements of the system user.

The directory for the company 362 includes a database with the identity of the various service providers or local service provider centers to which the distributor delivers phones. The database may include fields having the name of the company, telephone number, shipping locations, credit information and its system identification number (SID) and other data necessary to correlate the programming and delivery of phone units ordered by one of the listed companies.

The directory for MIN inventory 364 includes a database of available mobile identification numbers that are assignable to a phone unit when delivered to a company in a particular local service area. Because the MIN inventory is generally accessed from multiple issuing sites, the database must keep a real time inventory of available numbers and indicate when numbers are assigned to phone units or blocked for group assignment to a particular company on a multiple unit order.

The customer directory 366 includes a database of the customers and ultimate users of the phone units and includes fields for the user identity, credit information, calling restrictions and other data that is customer related. Since the identity of the customer is usually determined by the local service provider, the data for the customer files must be extracted from the files or return entry of the service provider. If the service provider is already keyed into the system, for example, by being a service center, or, retail outlet of the distributor, the data is entered into the system when the phone is activated for use in behalf of the ultimate user and automatically accessed by the system user or returned by the local issuer of the phone unit. The data retrieved by the credit check, for example, from the credit access resulting from a credit card swipe in credit card reader 338 of FIG. 9, allows evaluation and recording of credit data and customer identity.

Since the phone distribution system may be implemented with a retail outlet for programming and issuance of phones to a customer on the spot, like the phone rental setting the results of credit verification may justify limiting the initial number of calls, programming a phone lock upon reading a predetermined dollar limit or upon reaching a certain date. This would provide a service provider who is assigned a subscriber by a retail outlet an opportunity to assign risk and reevaluate the subscriber's credit standing under its own criteria without substantial costs being incurred. The feature of a programmed date lock and dollar lock is an improved feature for the rental system where close monitoring of calls is enabled, and is implemented in the distribution system where the phone units include a real time clock to enable data locking, or where the system user is or has access to the calling date of the service provider.

In the system shown in FIG. 10, data is extractable from each directory. The term directory is used in its general categorical sense, as opposed to any formalistic format for isolating data.

When a sales agent receives an order inquiry, an order form 368 is prompted on the computer. If the requesting company is already a client, the data is extracted from the company directory and automatically appears in the form, which may in fact be custom invoice and receipt forms for that company. The sales agent then enters the order details at the programming history Box 370 and the data is routed to the sales agent responsible for filling the order and programming the phones at Box 372. The phones are loaded into the gang platform and queried by the programming module of the system software to determine make, model and other data necessary to route the necessary programming instructions and data to the polled phone during the programming procedure. To provide an audit trail for tracking, data relating to each programmed phone is retrieved and stored in the database of the central information processor. If the customer is known at the time that the order details are entered then that data is stored on programming and assignment of the phone. If the customer identity is subsequently determined by the company, which, for example, is the service provider, the customer data is returned by the company on issuance of the phone to a subscriber.

The task of initial programming the phones in the system described is automated for up to 128 phones installed in modules 374 of the gang platform. Each module 374 is designed to hold sixteen phone units 336. The configuration described can be adapted to access two hundred fifty six phone units on reconfiguration for larger numbers is warranted. However, it has been found that programming the phones takes seconds for some models and minutes for others, so that the task of installing phones in the phone boots 376 and removing them for shipment is the time limiting factor, not the ability to program more phones at a time. In essence, the gang platform 324 comprises a plurality of modules 374 each having a plurality of boots 376 with each boot having an interlink receiver station 378 permitting the computer to directly communicate with each phone unit through the phone's connection port in the gang platform.

Using a UNIX operating system for the multi-task programming operation, the phone programming module of the distribution system periodically initiates a status command to gang platform such that a polling routine associated with each port terminal is sequenced to determine the presence of a phone unit installed in a platform boot.

Figure 11:
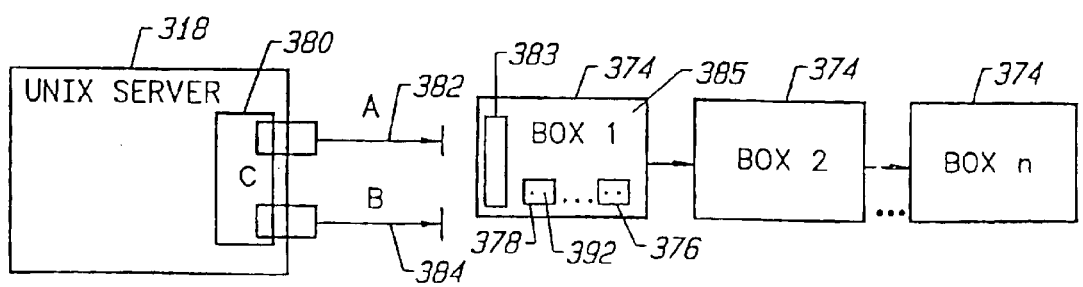
FIG. 11 is a block diagram of an overview of the routing system for multiple phone programming.

Referring to the block diagram of FIG. 11, the central information processor unit 318 communicates with a host network card, in this instance a Stallion EasyReach controller 380, which provides two useable channels 382 and 384 for communication with multiple gang platform modules 374, each holding boots 376 for preferably sixteen phone units. As noted a single channel, for example channel A, 382, can be utilized to program up to 128 phones. The host network controller 380 utilizes a standard X21 network protocol to communicate with a local Stallion EasyReach controller 383 in each of the gang platform modules 374. Each of the modules 374, for example, Box 1, Box 2 . . . to Box n, has assigned a network ID and communicates with the host card 380 as a networkable client. Each interlink receiver station 378 at each module boot 376 has port terminals 392 addressable by the following protocol: /dev/tty [box][channel][port]. For instance, port 0 of Box 1 on channel A, would be /dev/tty1a00.

Figure 14A:
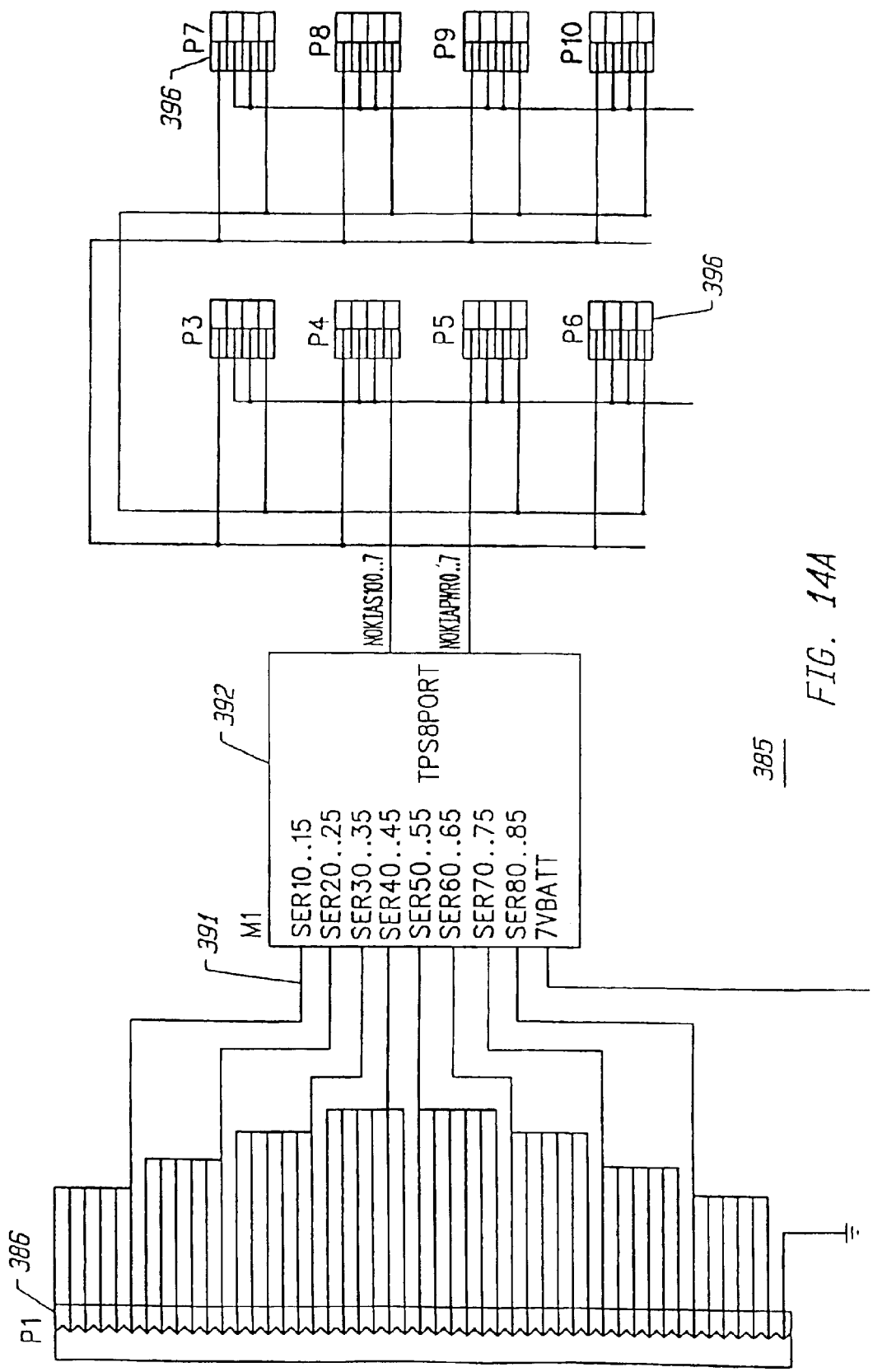
FIG. 14 is an electrical schematic diagram of the routing circuit at a platform module of the gang platform for programming multiple phones.
Figure 14B:
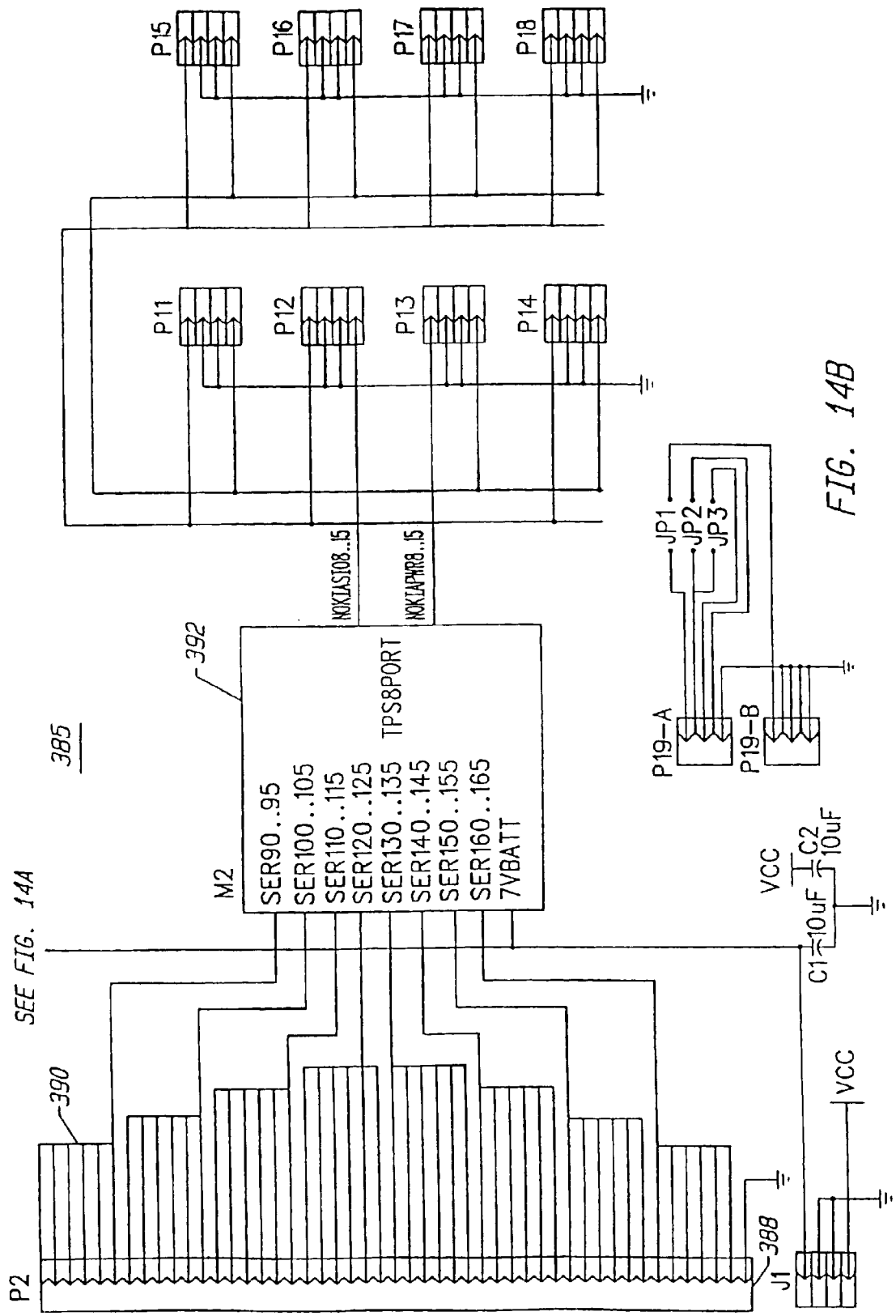

The overview as shown in the block diagram of FIG. 11 is schematically represented by the circuit diagram of FIG. 14. Only channel A is used for access to one hundred twenty eight stations. Two fifty-pin connectors 386 and 388 connect to the routing lines 390 of a mother board 385 in each sixteen boot module or Box 374 to provide sixteen communication channels 391 to port terminals 392 that are detailed in FIG. 15.

Figure 15:
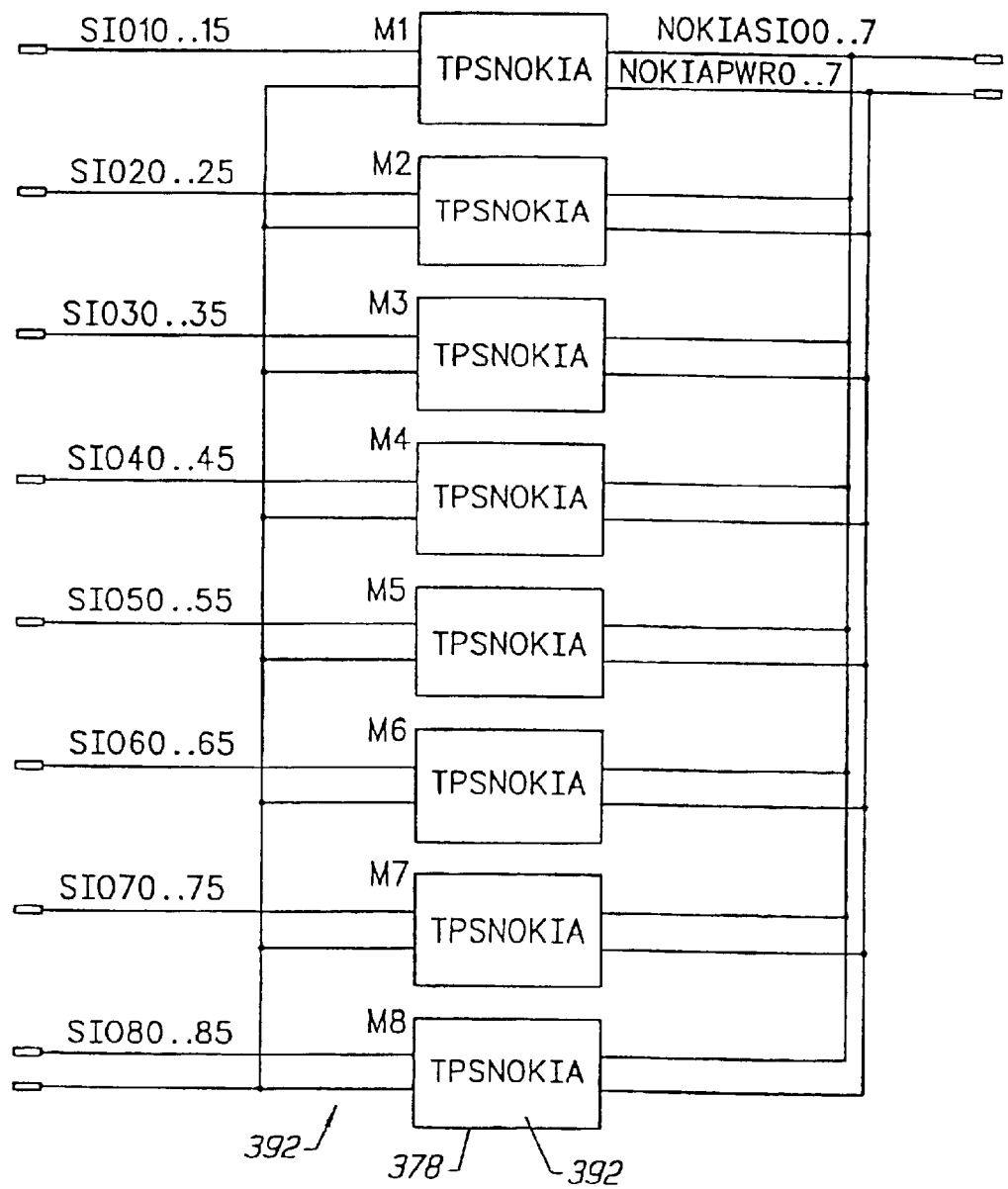
FIG. 15 is an electrical schematic diagram detailing a portion of routing circuit of FIG. 14.
Figure 16:
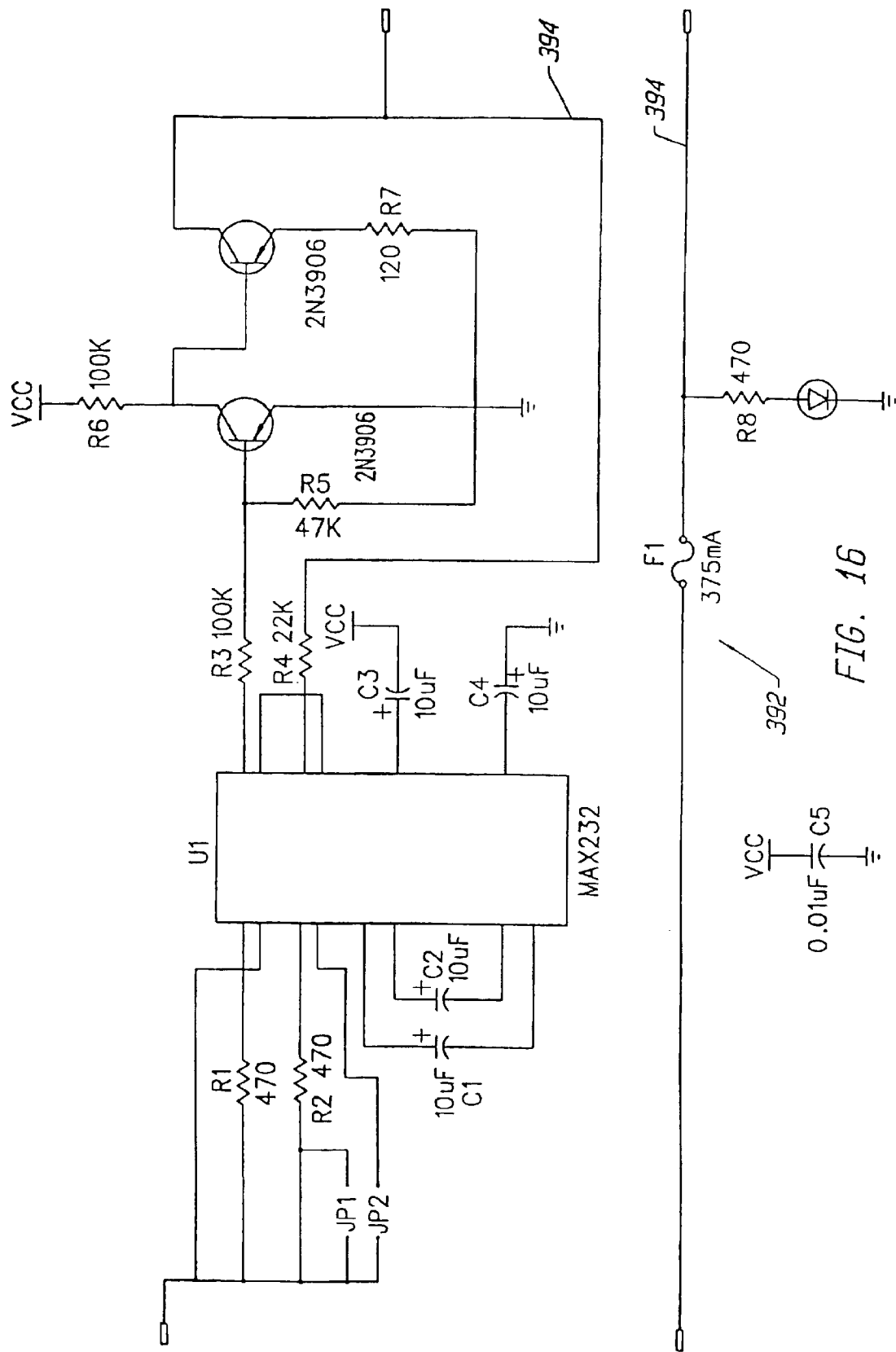
FIG. 16 is an electrical schematic diagram detailing a portion of the routing circuit of FIG. 15.
Figure 17:
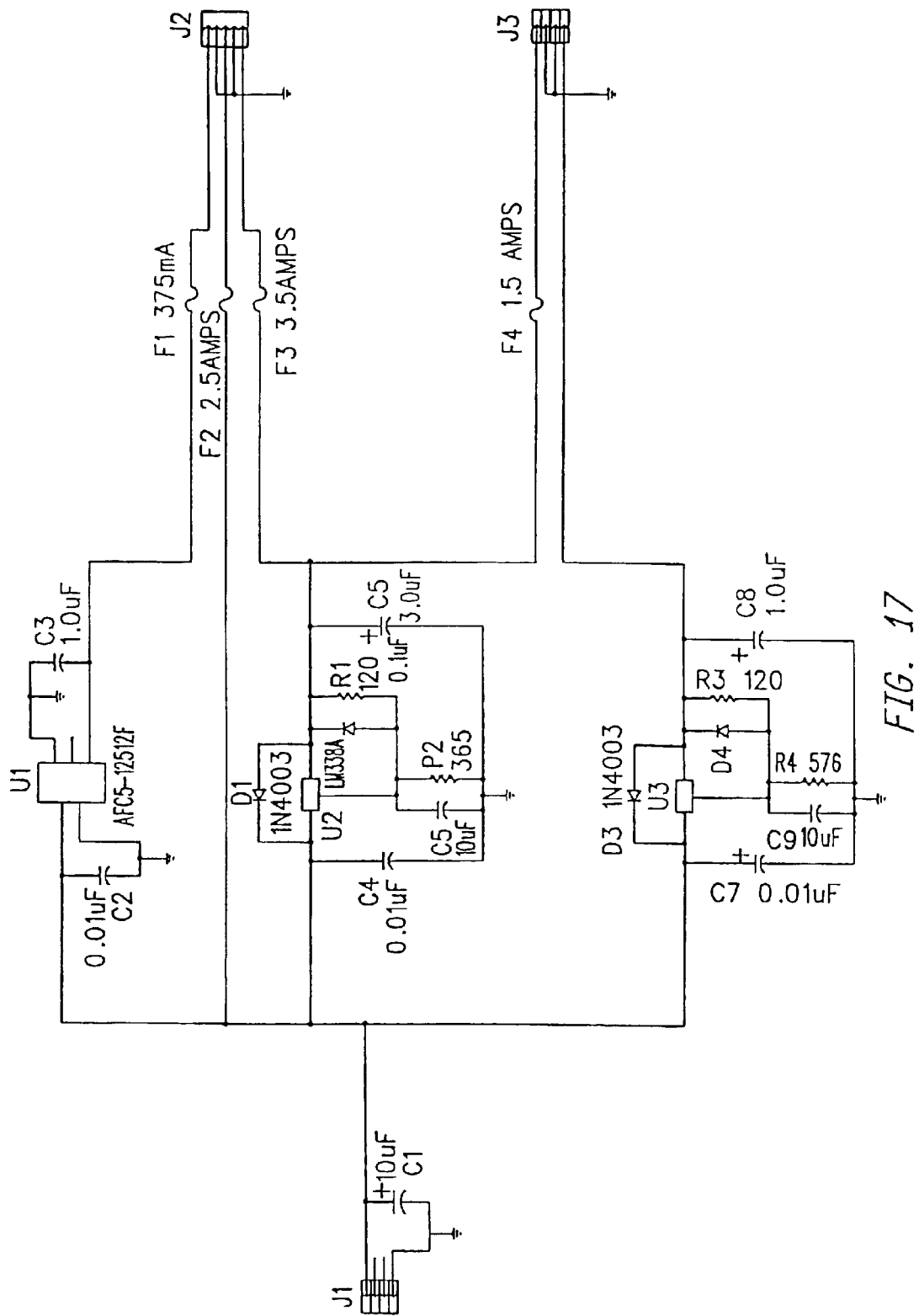
FIG. 17 is an electrical schematic diagram of the power circuit for the routing circuit of FIG. 14.

Referring to FIG. 15, port terminals 392 are configured to the particular electronics interface required for powering and programming each model of phone unit that operates with a different electronics standard. For example, referring to FIG. 16, the circuitry 394 necessary to power and program a NOKIA phone unit having a four pin connector terminal is shown for purposes of example only. It is to be understood that other models of the NOKIA phone unit or phone units of different manufacturers may require a different circuitry or different port connectors at the interlink receiver station 378 to enable connection, powering communication and programming of the phone unit. The port connectors 396 that ultimately interconnect with the terminal port connector on each phone unit is schematically shown in FIG. 14.

It is understood that each module 374 contains sixteen boots 376 with identical circuitry at each port terminal 392 for ease of fabrication of the mother board 385 and programming large numbers of phone units. Different modules may, however, have different sets of identical receiver stations. A lesser number of interlink receiver stations 378 and/or a mix of different receivers stations in one module for programming phones of different type, for example, of different model or manufacturer are included on a modified platform module 324a utilized at a service center system 314 as shown in FIG. 9. A similar configuration may be used at the retail delivery system 316. In such a setting, the ability to program a limited number of different phones from different manufacturers may be more important than volume programming. For example, a module having eight receiver stations with boots having eight different port stations allows either different phone units to be programmed. Although multiple units of a single model may have to be programmed one at a time, the ability to handle different phones is important to a retailer who sells phones one at a time.

Figure 12:
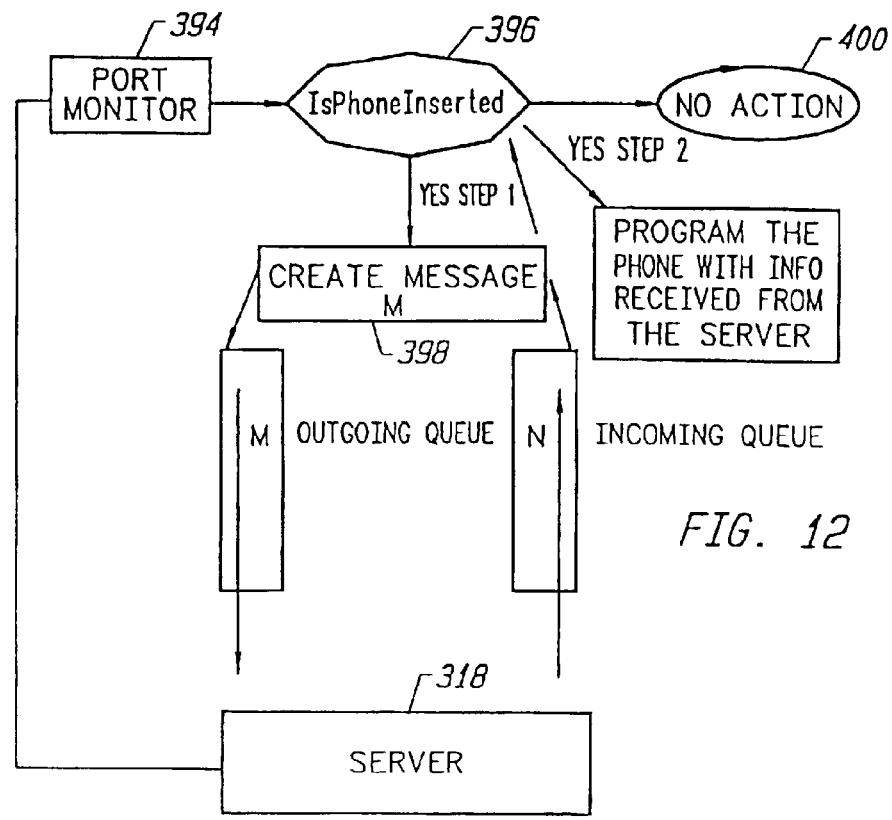
FIG. 12 is a block diagram of the routing sequence for multiple phone programming.
Figure 13:
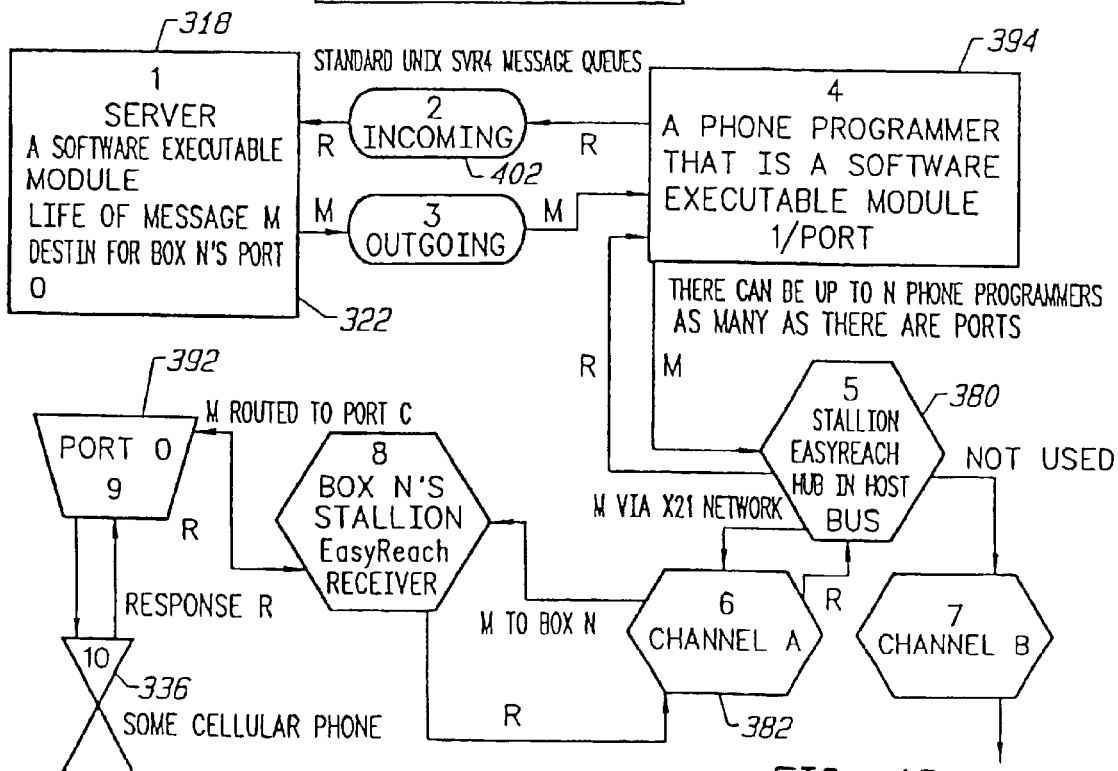
FIG. 13 is a block diagram of the routing system and routing sequence for multiple phone programming.

Referring to the block diagrams of FIGS. 12 and 13, the system program in the central information processor, Box 318, includes a port monitor module 394 for each port terminal 392 to detect when a phone is inserted into a boot and connected to the port terminal for that boot. A routine in this module 394, designated IsPhoneInserted, Box 396, is automatically activated every three to five seconds. If no phone is inserted, no message is returned and a "No Action" default, Box 400, results.

If a phone is installed, a command in the routine that does not modify the phone, for example, "read ESN," or "read MIN" generates a return message at Box 398 that is sent to a Standard Unix SVR4 Message queue 402 of the server 322 for processing by the system program of the central information processor 318. If the action desired is to gang program a plurality of new phone units installed in one or more port terminals 392 of one or more platform modules 374, the distribution system program messages the phone programmer module to execute the phone unit programming sequence. The programming sequence and data return for maintaining the programming history database are passed through the module controller, Box 380, that acts as a routing hub to the platform modules 374 and the connected port controller at each module, Box 383, that routes the programming sequence to the specified terminal port 392 that holds the particular phone unit 336 being programmed or accessed for data retrieval. Since it is preferred that the phone programmer module includes a separate programming sequence for each port, errors in initiating the wrong sequence for the particular phone type connectable to the phone terminal for that phone type will be eliminated. Phones form different manufacturers and even different phone models from the same manufacturer may require a different electronic circuit at the receiver station and a different programming sequence for communication with the informational processor running the system program. For convenience, the term "type" is used for phones compatible with a particular receiver station and port terminal. Together, the adapted circuitry of the receiver station and the selective programming sequence for selected type of mobile phone unit comprise the translation means for establishing the protocol for communicating with and programming a particular type of mobile phone unit or other mobile communication device. The configuration of the terminal port provides the physical and electronic terminal for connecting the distribution and tracking system to the mobile phone units, items generally manufactured by other parties. Alternately, where manufacturers standardize the terminal connectors on the phone and the electronic parameters for programming and operating the phone; the port terminals, boots, and electronics of the receiver station can become more generic.

Where high volume simultaneous programming of multiple phone units is not required, the system software can match the ESN or GIM with the proper phone programming procedure for that phone type and selectively route the execution of the program to the identified port terminal.

As a step in the programming procedure, the manufacturer's code for unlocking the phone unit for programming or reprogramming is encrypted using, for example, a psuedo C code encoding routine as follows:

```
char *GenerateNumber (int digits_to_return) {
    LOOP digits_to_return times
        CHOOSE a valid character for type of phone
        APPEND to string to return
    REPEAT-LOOP
    RETURN new anti-churn number
}
```

A higher level encryption routine current available from commercial software vendors may be used where greater security is required.

The telephone programming sequence includes a diagnostic test to ensure that all functions of the phone are operating efficiently. Once a phone unit has been programmed, tested and assigned a MIN, the programming is completed. A truncated programming procedure at the service center level is used for phones having a MIN which is identified by the system program upon insertion of the phone in a receiver station of a platform module. Alternately, the phone unit is identified by scanning the bar code label on the phone unit with the bar code reader. At the service center level, the phone is identified by MIN, ESN, GIM and other parameters to prompt a screen inquiry whether to run the diagnostics routine, reprogram the phone, assign a new SID, MIN or other parameter, or deactivate the phone recapturing the MIN for return to the MIN inventory.

Because the distribution system maintains a database of the phone programming history that is correlated with other data collected during receiving phones from the manufacturer, programming the phones, transferring phones to customers, assigning service provision contracts to service providers, and tracking the issuance of phones to the ultimate user, a wealth of relational data is acquired for report generation, remote polling, inventory control, E-mail reporting of test errors and other features useful to an integrated phone distribution operation.

In the event that errors should occur in the system, the errors are logged by time and date of occurrence. The errors are automatically reported to the system providers technical support node via e-mail. Technicians from the system provider can log-on the user system to investigate and correct reported problems.

The system utilizes an X Windows graphical user interface with option lists and pull down menus for system operation using a mouse control. Keyboard entry of data is minimized by the extensive use of existing data stored in the system database and the use of standard or custom templates for forms and reports.

Figure 18:
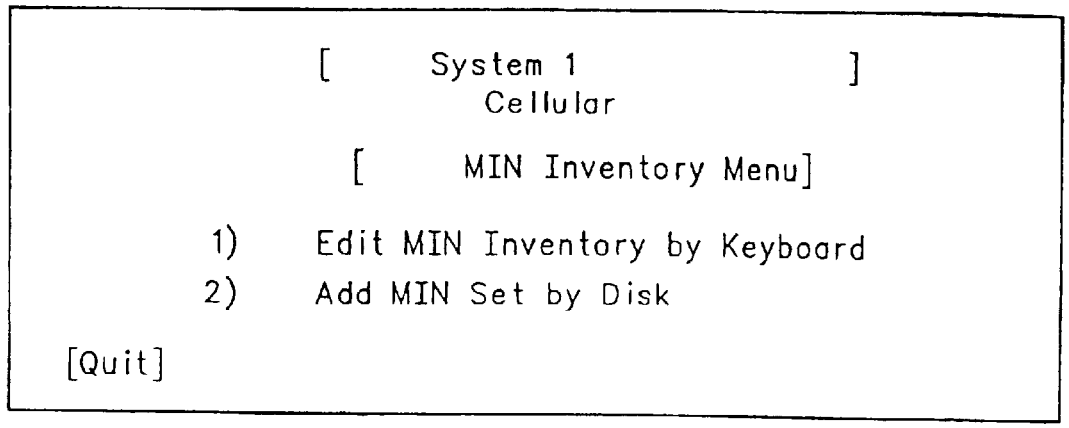
FIGS. 18A–18T are exemplar screen displays for uses of the distribution and tracking system.
Figure 18:
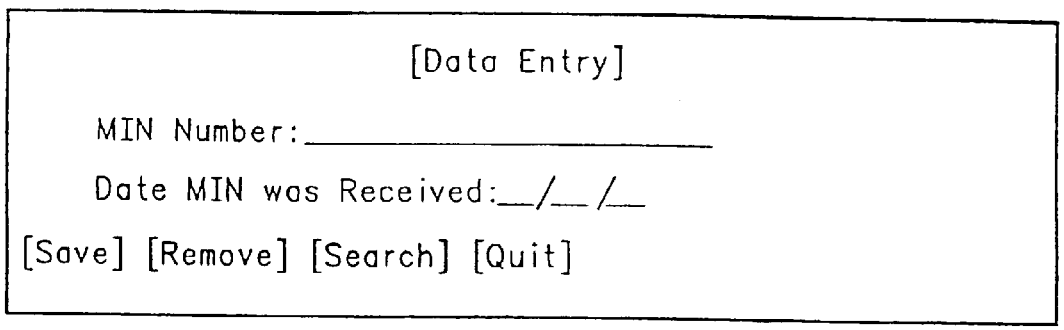
Figure 18:
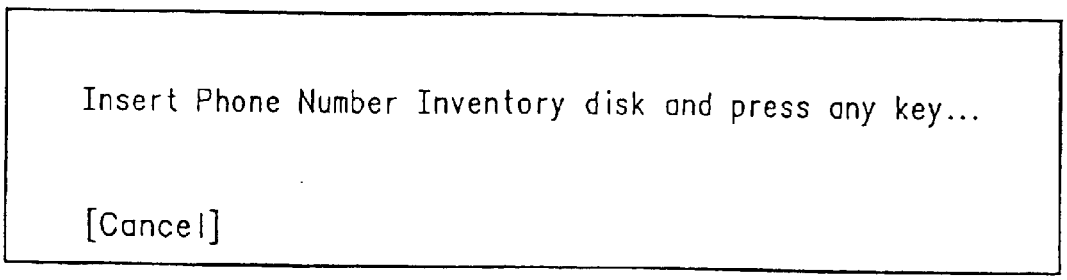

A sample of screen displays is shown in FIGS. 18A–18T. The screen displays, in part, illustrate the features carried out by the system software program for the distribution application, which is a part of the software code submitted in the accompanying Appendix. The screen displays include a Log-in screen for system connection, FIG. 18A and a Log-in screen for an authorized user, FIG. 18B, which on entry of a correct password, prompts a main menu, FIG. 18C. By keyboard or mouse selection of a listed item, the linked sub-menu or menus for the listed item is displayed, for example, MIN Inventory Maintenance, FIG. 18D; MIN Number Entry by Keyboard, FIG. 18E; MIN Number Entry by Disk Entry, for example where a group of MIN numbers were blocked for use with a batch of phones identified by ESN, FIG. 18F; Place or Ship Order FIG. 18G, an alternate, Place Order, FIG. 18H, Program Phones, FIGS. 18I–18J; Customer Maintenance, FIG. 18K; Company Maintenance FIG. 18L; Management Report Menu, FIG. 18M; including, MIN Inventory Report, FIG. 18N; Active Assignment Listing Report, FIG. 18O; Retail Outlet Listing Report, FIG. 18P; Open Orders, FIG. 18Q; Salesperson Listing, FIG. 18R; Customer History Listing, FIG. 18S; and, Shipment Listing, FIG. 18T.

With a proper access authority, the data stored in the central information processor 318 can be accessed from any terminal networked to the central information processor, such as the computer 328 for the service center system 314 or tho retail delivery system 316. When the central information processor 318 is a stand alone device or one modified for limited service without a central information clearinghouse, it is simply an information processor and may comprise any computer capable of handling the data processing, storage and routing requirements of the distribution, programming and tracking systems for mobile communication devices described herein.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A mobile phone programming and tracking system comprising:
    a gang platform having a plurality of interface units, each interface unit configured to receive a mobile phone unit and transmit programming information to said mobile phone unit; and
    an information processing unit connected to each of said gang platform interface units configured to control the gang platform interface units to simultaneously program a plurality of mobile phone units on an automated basis.

2. The system of claim 1 wherein the plurality of interface units include a plurality of interlink receivers.

3. The system of wherein claim 1 wherein one or more of the interface units receives instructions from said information processing unit for encrypting its corresponding mobile phone unit with an anti-churn code.

4. The system of claim 1 wherein the instructions received by each said mobile phone unit from said information processing unit include instructions for limiting use of said mobile phone unit when a predetermined credit amount is reached.

5. The system of claim 1 wherein said mobile phone units are programmed to collect call detail information for later transmission to the information processing unit.

6. The system of claim 1 wherein the instructions are modifiable to allow information unique to each mobile phone unit to be programmed.

7. The system of claim 1 further comprising:
    a customer activation system connected to the information processing unit via a communication link, the customer activation system including customer information that is to be used to program operations for each of the plurality of mobile phone units with information which is specific to a particular customer.

8. The system of claim 1 wherein said information processing unit can initiate a polling routine directed to each of said interface units to determine whether a mobile phone unit is received within the interface unit.

9. A mobile phone programming and tracking system comprising:
    a gang platform having a plurality of interface units, each interface unit configured to receive different types of mobile phone units and transmit programming information to its mobile phone unit; and
    an information processing unit connected to each of said gang platform interface units configured to control the gang platform interface units to program a plurality of different types of mobile phone units on an automated basis in an way which is appropriate to each type of mobile phone unit.

10. The system of claim 9 wherein the information processing unit can program different types of mobile phone units simultaneously.

11. The system of claim 9 wherein said mobile phone units can be programmed to work with different telephone service providers.

12. The system of claim 9 wherein one or more of the interface units receives instructions from said information processing unit for encrypting its corresponding mobile phone unit with an anti-churn code.

13. The system of claim 9 wherein the instructions received by each said mobile phone unit from said information processing unit include instructions for limiting use of said mobile phone unit when a predetermined credit amount is expended.

14. The system of claim 9 wherein said mobile phone units are programmed to collect call detail information for later transmission to the information processing unit.

15. The system of claim 9 wherein the instructions are modifiable to allow information unique to said type of mobile phone unit to be programmed.

16. The system of claim 9 further comprising:
    a customer activation system connected to the information processing unit via a communication link, the customer activation system including customer information that is to be used to program operations for each of the plurality of mobile phone units with information which is specific to a particular customer.

17. The system of claim 9 wherein said information processing unit can initiate a polling routine directed to each of said interface units to determine whether a mobile phone unit is received within the interface unit and, if so, what type of mobile phone unit it is.

* * * * *